US007422993B2

(12) United States Patent
Takewaki et al.

(10) Patent No.: US 7,422,993 B2
(45) Date of Patent: Sep. 9, 2008

(54) ADSORBENT FOR ADSORPTION HEAT PUMP, ADSORBENT FOR HUMIDITY-CONTROL AIR CONDITIONER, ADSORPTION HEAT PUMP AND HUMIDITY-CONTROL AIR CONDITIONER

(75) Inventors: Takahiko Takewaki, Yokohama (JP); Masanori Yamazaki, Yokohama (JP); Hiromu Watanabe, Yokohama (JP); Hiroyuki Kakiuchi, Yokkaichi (JP); Eri Kanamori, Yokohama (JP); Shigeru Terada, Yokohama (JP); Miki Iwade, Kurashiki (JP)

(73) Assignee: Mitsubishi Chemical Corporation, Tokyo (JP)

( * ) Notice: Subject to any disclaimer, the term of this patent is extended or adjusted under 35 U.S.C. 154(b) by 406 days.

(21) Appl. No.: 11/235,704

(22) Filed: Sep. 27, 2005

(65) Prior Publication Data
US 2006/0130652 A1 Jun. 22, 2006

Related U.S. Application Data

(63) Continuation-in-part of application No. PCT/JP2004/001867, filed on Feb. 19, 2004.

(30) Foreign Application Priority Data
Apr. 1, 2003 (JP) ............................. 2003-097629

(51) Int. Cl.
*F25B 17/08* (2006.01)
*B01J 20/08* (2006.01)
*B01D 53/28* (2006.01)

(52) U.S. Cl. ............................. 502/61; 502/74; 62/112; 62/238.3; 62/324.2; 62/476

(58) Field of Classification Search .................. 95/117, 95/148; 502/60, 61, 73, 74; 62/112, 238.3, 62/324.2, 476; 252/69
See application file for complete search history.

(56) References Cited

U.S. PATENT DOCUMENTS 4,554,143 A 11/1985 Messina et al.

(Continued)

FOREIGN PATENT DOCUMENTS

EP 0 770 836 B1 5/1994

(Continued)

OTHER PUBLICATIONS

International Search Report of PCT/JP2004/001867, mailed Apr. 13, 2004.

*Primary Examiner*—Frank M Lawrence
(74) *Attorney, Agent, or Firm*—Nixon & Vanderhye P.C.

(57) ABSTRACT

The present invention provides an adsorbent for adsorption heat pump and humidity-control air conditioner, which is capable of adsorbing an adsorbate therein and desorbing the adsorbate therefrom in a narrow relative vapor pressure range, and can be regenerated (desorption) at a low temperature. Also, the present invention provides an adsorption heat pump and humidity-control air conditioner using the adsorbent which can be effectively operated even by a low-temperature heat source, as well as methods of operating the adsorption heat pump and humidity-control air conditioner by effectively utilizing low-temperature exhaust heat. The absorbent of the present invention comprises zeolite containing (i) aluminum, (ii) phosphorus and (iii) iron and/or gallium in a skeletal structure thereof, which is substantially free from change in structure upon subjecting the adsorbent to adsorption and desorption of water vapor.

23 Claims, 14 Drawing Sheets

U.S. PATENT DOCUMENTS

| | | | |
|---|---|---|---|
| 4,637,218 A * | 1/1987 | Tchernev | 62/106 |
| 6,423,295 B1 * | 7/2002 | Huo | 423/705 |
| 2004/0093876 A1 * | 5/2004 | Inagaki et al. | 62/112 |
| 2006/0245994 A1 * | 11/2006 | Watanabe et al. | 423/305 |

FOREIGN PATENT DOCUMENTS

| | | |
|---|---|---|
| EP | 1 363 085 A1 | 11/2003 |
| JP | 11-114410 | 4/1999 |
| JP | 11-197439 | 7/1999 |
| JP | 2000-061251 | 2/2000 |
| JP | 2000-257912 | 9/2000 |
| JP | 2002-372332 A | 12/2002 |
| JP | 2003-114067 A | 4/2003 |
| JP | 2004-93117 A | 3/2004 |

* cited by examiner

Solar-Energy-Assisted
Hot Water Supplier

Cold Heat Generation

Warm Water Production System

ADSORBENT FOR ADSORPTION HEAT PUMP, ADSORBENT FOR HUMIDITY-CONTROL AIR CONDITIONER, ADSORPTION HEAT PUMP AND HUMIDITY-CONTROL AIR CONDITIONER

CROSS-REFERENCE TO RELATED APPLICATION

This application is a continuation-in-part application of copending international patent application PCT/JP2004/001867 which was filed on Feb. 19, 2004, which is incorporated by reference.

TECHNICAL FIELD

The present invention relates to specific adsorbents, an adsorption heat pump and a humidity-control air conditioner using the same, and methods of operating the adsorption heat pump and the humidity-control air conditioner.

BACKGROUND ART

An adsorption heat pump is one of the most excellent exhaust heat recovery means which can be operated by a low-grade heat energy as a heat source without using any auxiliary power, and is expected to provide a useful means which is applicable to thermal energy utilization systems of environment-favorable type. In the operation of the adsorption heat pump, in order to regenerate an absorbent used therein into which an adsorbate such as water is adsorbed, the adsorbent is heated to desorb the adsorbate therefrom, and then the dried absorbent is cooled to the temperature at which the adsorbent is used for adsorbing the adsorbate again.

Hitherto, absorption-type heat pumps using exhaust heat and warm heat having a relatively high temperature of 120° C. or higher as a heat source for regenerating an adsorbent used therein, have been introduced into thermal and electric energy simultaneous generation plants (cogeneration systems) as a part thereof, and already put into practice. However, in general, exhaust heat and warm heat finally generated in cogeneration equipments and fuel cells have a relatively low temperature not more than 100° C., actually not more than 80° C. Therefore, the heat generated in these equipments is unusable as a heat source for driving the absorption-type heat pumps. In addition, since the low-temperature heat energy generated from these equipments has a low energy density, recovery and reuse of the heat require high costs, so that a substantially whole part thereof is discharged outside without reuse. The total amount of the low-temperature heat energy discharged without reuse reaches 90% or higher of a whole exhaust heat produced, thereby preventing comprehensive improvement in energy utilization efficiency. For this reason, it has been demanded to effectively use the low-temperature exhaust heat, specifically, exhaust heat having a temperature of 100° C. or lower and further from 60 to 80° C.

On the other hand, humidity-control air conditioners such as dehumidifying-type air conditioners and humidifying-type air conditioners are useful as one of exhaust heat recovery regeneration means similarly to the adsorption heat pump. However, there are known no humidity-control air conditioners using the low-temperature heat energy as a driving heat source thereof.

Although the adsorption heat pumps or humidity-control air conditioners are operated by the same principle, adsorbents used therein are required to have different adsorption properties depending upon a temperature of heat sources usable therefor. For example, exhaust heat discharged from gas engine cogeneration systems or solid polymer-type fuel cells which are used as a high-temperature side heat source of the adsorption heat pumps or humidity-control air conditioners, has a temperature of 60 to 80° C. Whereas, in the case where the above exhaust heat is used as the high-temperature side heat source of the adsorption heat pumps or humidity-control air conditioners, the temperature of a cooling side heat source thereof is determined by limitations such as a temperature of location where these equipments are installed. For example, when the equipments are installed in factories or houses, the temperature of the cooling side heat source is a temperature of air outside of the buildings. More specifically, when the adsorption heat pumps or humidity-control air conditioners are installed within the buildings, the operating temperatures thereof are from about 30 to 35° C. on a low-temperature side thereof and from about 60 to 80° C. on a high-temperature side thereof. In the summer season during which need of cold heat is increased, since rise of the outside air temperature is forecast, there is a high possibility that the low-temperature side temperature exceeds the above-specified temperature. Therefore, in order to efficiently utilize the exhaust heat, it is demanded to provide an apparatus which can be operated even under such a condition that a difference in temperature between the low-temperature side heat source and high-temperature heat source thereof is small, and the temperature of the low-temperature side heat source is not less than 30° C. and the temperature of the high-temperature side heat source is not more than 80° C.

To solve the above problem, it is required that an adsorptive material used in the equipments exhibits the following adsorption properties. More specifically, there is demanded such an adsorbent capable of (1) exhibiting an appropriate amount of adsorption even in such a range in which a difference between a relative vapor pressure upon adsorption and that upon desorption is small, (2) having a large difference in amount of adsorption over the range described in the above (1) for the purpose of compactness of the equipments used, and further (3) performing a facilitated desorption even under a high relative vapor pressure.

Various adsorbents have been studied for use in the adsorption heat pumps or humidity-control air conditioners. However, these adsorbents have various problems to be solved.

Y-type zeolites which have been conventionally studied for use as an adsorbent for the adsorption heat pumps or humidity-control air conditioners, adsorb an adsorbate therein even under a relative vapor pressure close to about zero and, therefore, is required to expose to a high temperature ranging from 150 to 200° C. or more in order to bring the relative vapor pressure to substantially zero for desorbing the adsorbate therefrom. Therefore, it may be difficult to apply the Y-type zeolites to the adsorption heat pumps or humidity-control air conditioners utilizing the above low-temperature exhaust heat.

A-type silica gels which have also been conventionally studied as the adsorbent, exhibit insufficient adsorption properties under a low relative vapor pressure. Further, in Japanese Patent Application Laid-Open (KOKAI) No. 9-178292 (1997), there is described meso-porous silica (FSM-10, etc.) synthesized by using a micelle structure of surfactant as a template. However, such meso-porous silica is incapable of adsorbing an adsorbate under a low relative vapor pressure. Therefore, there is such a problem that the A-type silica gels or meso-porous silica are inapplicable as a constituting element of the adsorption heat pumps or humidity-control air conditioners utilizing a cooling water obtained from the above cogeneration equipments or fuel cells, or heat obtained from solar energy.

In addition, among the conventional adsorbents, the mesoporous silica tends to suffer from breakage of its structure, in addition to need of improving adsorption properties thereof, and further requires high costs owing to difficult industrial production thereof. On the other hand, the Y-type zeolites or A-type silica gels tend to be insufficient in adsorption properties notwithstanding low production costs and hardly broken structure thereof.

Also, in Japanese Patent Application Laid-Open (KOKAI) No. 11-197439(1999), it is described that a porous aluminophosphate-based zeolite called AlPO-n is used as an adsorbent for dehumidifying-type air conditioners. In Examples of this Japanese Patent Application, there is described the adsorption isotherm of $AlPO_4$-5. However, the zeolite exhibits a slightly high hydrophobic property and, therefore, is incapable of sufficiently adsorbing water vapor at a relative humidity of 0.25 at a temperature of 25° C. More specifically, in the above zeolite, the change in amount of water adsorption thereof when changing a relative humidity by 0.1 in a relative humidity range of from 0.12 to 0.25 at a temperature of 25° C. (which is a necessary condition for the adsorbent of the present invention required for effectively using the low-temperature exhaust heat therein as described hereinlater) is as low as about 0.05 g/g, and, therefore, the above zeolite tends to be deteriorated in such adsorption properties.

In addition, in WO 02/066910, it is described that zeolite containing aluminum, phosphorus and hetero atom is useful as an adsorbent for adsorption heat pumps. However, the invention of WO 02/066910 mainly aims to use automobile exhaust heat having a temperature of about 100° C. which is relatively high among the low-temperature exhaust heats. In the zeolite described concretely in WO 02/066910, the change in amount of water adsorption thereof when changing a relative humidity by 0.1 in a relative humidity range of from 0.12 to 0.25 at a temperature of 25° C. (which is a necessary condition for the adsorbent of the present invention required for effectively using the low-temperature exhaust heat therein as described hereinlater) is as low as about 0.02 g/g, and, therefore, the zeolite tends to be deteriorated in adsorption properties. That is, in the zeolite, the amount of water adsorption thereof at a relative humidity of 0.12 which is an index of the desorption property of the adsorbent used in the present invention as described hereinlater, is large owing to poor desorption property thereof, so that the change in amount of water adsorption of the zeolite tends to become insufficient.

Further, in WO 02/066910, although various atoms including iron are exemplified as the hetero atom, only Si was actually used as the hetero atom in Examples thereof, and the framework density of the zeolite is as low as 16 or less.

In addition, in Examples of Japanese Patent Application Laid-Open (KOKAI) No. 2000-61251, there is described the adsorption isotherm of AlPO—H6. In view of the adsorption properties shown in the adsorption isotherm, the AlPO—H6 satisfies the necessary condition for the adsorbent of the present invention as described hereinlater, i.e., such a condition that the change in amount of water adsorption thereof when changing a relative humidity by 0.1 in a relative humidity range of from 0.12 to 0.25 at a temperature of 25° C. is not less than 0.12 g/g, and, therefore, is considered to provide an adsorbent to which the low-temperature exhaust heat is effectively applicable. However, according to the present inventors' studies, it has been found that the AlPO—H6 tends to be deteriorated in durability.

More specifically, according to the present inventors' studies, zeolites which suffer from structure change between water vapor-adsorbed state and water vapor-desorbed state, are unstable in their structure, so that upon repeated use, the adsorption property thereof tends to be deteriorated, or the structure thereof tends to be broken, thereby rendering the zeolites unusable. The above AlPO—H6 described in Japanese Patent Application Laid-Open (KOKAI) No. 2000-61251 represents a water vapor-adsorbed state, whereas the substance is transformed into a structure represented by AlPO-D when water vapor is desorbed therefrom. This phenomenon is described, for example, in "Molecular Sieve Science and Technology", Vol. 1 (Springer 1998), p. 160. Thus, the above AlPO—H6 tends to be insufficient in durability when repeatedly used for adsorption and desorption of water vapor.

DISCLOSURE OF THE INVENTION

The present invention has been conducted to achieve the following objects. That is, an object of the present invention is to provide absorbents for adsorption heat pump and humidity-control air conditioner capable of being operated at a low-temperature side heat source temperature of not less than 30° C. and a high-temperature side heat source temperature of not more than 80° C. which can adsorb an adsorbate therein and desorb the adsorbate therefrom even in a low relative vapor pressure range, as well as an adsorption heat pump and a humidity-control air conditioner which can be operated at a high efficiency using the above adsorbents. Also, another object of the present invention is to provide a method of operating an adsorption heat pump and a humidity-control air conditioner by utilizing a low-temperature exhaust heat.

As a result of the present inventors' earnest study for solving the above problems, it has been found that zeolite which contains specific atoms in a skeletal structure thereof and has a specific operable relative vapor pressure range wherein a difference in amount of water adsorption thereof lies in a specific range, and which is substantially free from structural change upon subjecting the zeolite to adsorption and desorption of water vapor, is suitable as the adsorbent for adsorption heat pump and humidity-control air conditioner which can be operated using the adsorption and desorption of adsorbate by the adsorbent as a driving source. Further, the present inventors have found a specific zeolite-based adsorbent which can adsorb the adsorbate therein and desorb the adsorbate therefrom in a specific temperature range, has a large difference in amount of water adsorption upon adsorption and desorption thereof, and exhibits a large output density.

To accomplish the aims, the present invention includes the following seven aspects.

In a first aspect of the present invention, there is provided an absorbent for adsorption heat pump, comprising zeolite containing (i) aluminum, (ii) phosphorus and (iii) iron and/or gallium in a skeletal structure thereof, which is substantially free from change in structure upon subjecting the adsorbent to adsorption and desorption of water vapor, and has an operable relative vapor pressure range in which a change in amount of water adsorption of the adsorbent when changing the relative vapor pressure by 0.1 in a relative vapor pressure range of from 0.1 to 0.25 in a water vapor adsorption isotherm measured at a temperature of 25° C., is not less than 0.12 g/g.

In a second aspect of the present invention, there is provided an adsorbent for adsorption heat pump, comprising zeolite containing (i) aluminum, (ii) phosphorus and (iii) iron in a skeletal structure thereof, wherein the zeolite satisfies:

(a) a framework density of from more than 16.0 T/1000 Å³ to 19.0 T/1000 Å³;

(b) the following formulae (I) and (II):

$$Ta+28°C. \leq Td \leq 100°C. \quad (I)$$

$$Ta-25°C. \leq Tcool \leq 25°C. \quad (II)$$

wherein Ta is a water vapor adsorption temperature in the range of from 25 to 45° C.; Td is a water vapor desorption temperature; and Tcool is a temperature of cold generated; and (c) a difference between an amount of water vapor adsorption of the adsorbent at the adsorption temperature (Ta) and an amount of water vapor adsorption thereof at the desorption temperature (Td), of not less than 0.1 g/g.

In a third aspect of the present invention, there is provided a heat pump using the above adsorbent, which comprises:

an adsorber which repeatedly conducts an operation of adsorbing an adsorbate therein while releasing heat of adsorption generated, and an operation of desorbing the adsorbate therefrom by external warm heat;

an evaporator which obtains cold heat obtained by vaporization of the adsorbate outside, and recovers a vapor of the adsorbate generated into the adsorber; and a condenser which condenses a vapor of the adsorbate desorbed from the absorbent of the adsorber by external cold heat, and supplies the condensed adsorbate to the evaporator.

In a fourth aspect of the present invention, there is provided a method of operating the adsorption heat pump, comprising using any one of exhaust heat generated from solid polymer-type fuel cells, exhaust heat generated from solar energy-assisted hot water suppliers and exhaust heat generated from internal combustion engine-assisted cogeneration systems, as external warm heat for desorbing the adsorbate from the absorbent.

In a fifth aspect of the present invention, there is provided an absorbent for humidity-control air conditioner, comprising zeolite containing (i) aluminum, (ii) phosphorus and (iii) iron and/or gallium in a skeletal structure thereof, which is substantially free from change in structure upon subjecting the adsorbent to adsorption and desorption of water vapor, and has an operable relative vapor pressure range in which a change in amount of water adsorption of the adsorbent when changing the relative vapor pressure by 0.1 in a relative vapor pressure range of from 0.1 to 0.25 in a water vapor adsorption isotherm measured at a temperature of 25° C., is not less than 0.12 g/g.

In a sixth aspect of the present invention, there is provided a humidity-control air conditioner comprising an adsorption and desorption portion including an adsorbent, and a heat supply mechanism for feeding heat to the adsorption and desorption portion, wherein the adsorbent is the absorbent as defined in the above aspects.

In a seventh aspect of the present invention, there is provided a method of operating the above humidity-control air conditioner, comprising any one of exhaust heat generated from solid polymer-type fuel cells, exhaust heat generated from solar energy-assisted hot water suppliers and exhaust heat generated from internal combustion engine-assisted cogeneration systems, as external warm heat for desorbing the adsorbate from the absorbent.

PREFERRED EMBODIMENT FOR CARRYING OUT THE INVENTION

Figure 1:
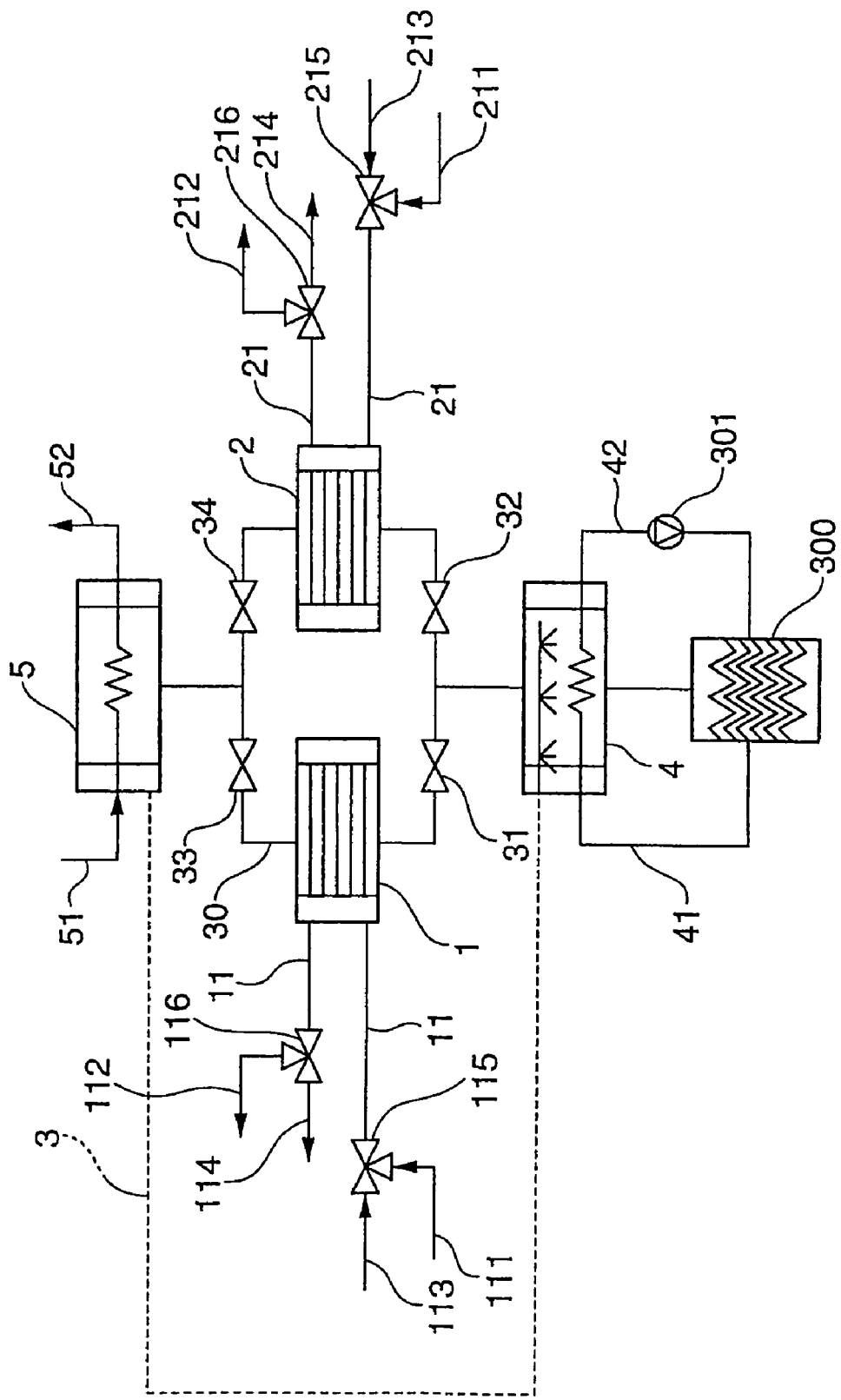
FIG. 1 is a flow diagram showing an example of construction of an adsorption heat pump to which an adsorbent for adsorption heat pump according to the present invention is applicable.

The present invention is described in detail below.

First, the adsorbent is explained from the standpoints of adsorption properties required for the adsorption heat pump. The vapor pressure range in which the adsorption heat pump can be operated, is determined by a desorption-side relative vapor pressure ($\phi 1$) and an adsorption-side relative vapor pressure ($\phi 2$), which are obtained from a high-temperature heat source temperature ($T_{high}$), a low-temperature heat source temperature ($T_{low\ 1}$), a low-temperature heat source temperature ($T_{low\ 2}$) and a temperature of cold generated ($T_{cool}$). The desorption-side relative vapor pressure ($\phi 1$) and the adsorption-side relative vapor pressure ($\phi 2$) are respectively calculated from the following formulae, and the operable relative vapor pressure range lies between the desorption-side relative vapor pressure ($\phi 1$) and the adsorption-side relative vapor pressure ($\phi 2$).

Desorption-side relative vapor pressure ($\phi 1$)=
Equilibrium vapor pressure ($T_{low\ 1}$)/Equilibrium vapor pressure ($T_{high}$)

Adsorption-side relative vapor pressure ($\phi 2$)=
Equilibrium vapor pressure ($T_{cool}$)/Equilibrium vapor pressure ($T_{low\ 2}$)

Here, the high-temperature heat source temperature ($T_{high}$) means a temperature of a heating medium used upon regenerating the adsorbent by desorbing an adsorbate therefrom; the low-temperature heat source temperature ($T_{low\ 1}$) means a temperature of the adsorbate in a condenser; the low-temperature heat source temperature ($T_{low\ 2}$) means a temperature of a cooling medium used upon subjecting the regenerated adsorbent to adsorption of the adsorbate; and the temperature of cold generated ($T_{cool}$) means a temperature of the adsorbate in an evaporator, i.e., temperature of cold heat produced. In the above formulae, the equilibrium vapor pressures ($T_{low\ 1}$), ($T_{high}$), ($T_{cool}$) and ($T_{low\ 2}$) represent equilibrium vapor pressures at the respective temperatures ($T_{low\ 1}$), ($T_{high}$), ($T_{cool}$) and ($T_{low\ 2}$), and are determined from the respective temperatures using an equilibrium vapor pressure curve of the adsorbate.

In the following, the operable vapor pressure range is explained by exemplifying the case where water is used as the adsorbate. The adsorption-side relative vapor pressure ($\phi2$) is 0.22 when the temperature of cold generated ($T_{cool}$) is 10° C. and the low-temperature heat source temperature ($T_{low\ 2}$) is 35° C., and is 0.25 when the temperature of cold generated ($T_{cool}$) is 8° C. and the low-temperature heat source temperature ($T_{low\ 2}$) is 30° C. Whereas, the desorption-side relative vapor pressure ($\phi1$) is 0.14 when the low-temperature heat source temperature ($T_{low\ 1}$) is 30° C. and the high-temperature heat source temperature ($T_{high}$) is 70° C., and is 0.12 when the low-temperature heat source temperature ($T_{low\ 1}$) is 35° C. and the high-temperature heat source temperature ($T_{high}$) is 80° C.

Thus, in the case where the adsorption heat pump is driven by using exhaust heat from gas engine cogeneration systems, solid polymer-type fuel cells or factories, it is considered that the operable relative vapor pressure range (i.e., range between the desorption-side relative vapor pressure ($\phi1$) and the adsorption-side relative vapor pressure ($\phi2$)) is from 0.12 to 0.25, preferably from 0.13 to 0.25, more preferably from 0.14 to 0.22. That is, the use of a material exhibiting a large change in amount of water adsorption in the operable relative vapor pressure range is preferred.

Next, properties required for the adsorbent are explained.

In the following, there is supposed such a case where an air cooling capacity of 5.0 kW (=18000 kJ) is obtained by the adsorption heat pump. Here, the air cooling capacity of 5.0 kW corresponds to a cooling performance capable of cooling about sixteen mat Japanese-style room of a wooden house facing the south. Since the amount of latent heat of vaporization of water is about 2500 kJ/kg, when the cycle time of change-over between adsorption and desorption of the heat pump is 10 min (6 cycles per hour) and the amount of water adsorption of the adsorbent is 0.12 g/g, the amount of the adsorbent required is 10.0 kg as calculated below.

Amount of adsorbent required:

$$18000\ kJ / (2500\ kJ \times 0.12\ kg/kg \times 6\ cycles/hour) = 10.0\ kg$$

Similarly, when the amount of water adsorption of the adsorbent is 0.15 g/g, the amount of the adsorbent required is 8 kg. Further, in the case where the cycle time of change-over between the adsorption and desorption is 6 min (10 cycles per hour), when the amount of water adsorption of the adsorbent is 0.12 g/g, the amount of the adsorbent required is 6.0 kg, whereas when the amount of water adsorption thereof is 0.15 g/g, the amount of the adsorbent required is 4.8 kg. Although the amount of water adsorption of the adsorbent is preferably as large as possible, the weight and volume of the adsorbent used is preferably as small as possible. This is because the apparatus used is generally required to have a smaller size and a larger capacity owing to limited installation area thereof. For example, when the difference in water adsorption of the adsorbent is 0.05 g/g, the amount of the absorbent required is 24 kg. In order to satisfy these contradictory requirements at the same time, it is required to increase the amount of water adsorption of the adsorbent. Therefore, the amount of water adsorption of the adsorbent is not less than 0.12 g/g, preferably not less than 0.135 g/g, more preferably not less than 0.14 g/g and most preferably not less than 0.15 g/g. Thus, when the change in amount of water adsorption of the adsorbent depending upon the change in relative vapor pressure is small, the volume of the adsorbent as required is increased, resulting in disadvantageously large scale of the apparatus used.

Further, the adsorbent is preferably made of a material exhibiting a large change in amount of adsorption in a narrow relative vapor pressure range. This is because when the change in amount of adsorption of the adsorbent is large in a narrow relative vapor pressure range, the amount of the adsorbent required to attain the same amount of adsorption under the same conditions can be reduced, thereby enabling the adsorption heat pump to be operated even when the difference in temperature between cooling and heating heat sources is small. From this viewpoint, the adsorbent is required to have such an operable relative vapor pressure range in which the change in amount of water adsorption thereof, when changing the relative vapor pressure by 0.1 in a relative vapor pressure range of from 0.12 to 0.25 in a water vapor adsorption isotherm measured at temperature of 25° C., is not less than 0.12 g/g. In particular, the adsorbent preferably has such an operable relative vapor pressure range in which the change in amount of water adsorption under the above conditions is not less than 0.15 g/g. The upper limit of the change in amount of water adsorption of the adsorbent under the above conditions is not particularly limited, and usually not more than about 0.3 g/g due to limited materials thereof.

From the standpoint of adsorption performance, when the relative vapor pressure is 0.25 in the water vapor adsorption isotherm measured at a temperature of 25° C., the amount of water adsorption of the adsorbent is preferably not less than 0.12 g/g, more preferably not less than 0.15 g/g. The upper limit of the amount of water adsorption of the adsorbent under the above conditions is not particularly limited, and usually not more than 0.3 g/g. On the other hand, from the standpoint of desorption performance, when the relative vapor pressure is 0.12 in the water vapor adsorption isotherm measured at a temperature of 25° C., the amount of water adsorption of the adsorbent is preferably not more than 0.05 g/g, more preferably not more than 0.03 g/g, most preferably not more than 0.02 g/g. The lower limit of the amount of water adsorption of the adsorbent under the above conditions is preferably as close to zero as possible, and usually not less than 0.00001 g/g.

Next, the adsorbent is explained from the viewpoint of adsorption properties required for humidity-control air conditioners. In the present invention, the "humidity-control" means a technique for controlling a humidity in an air-conditioning space. Therefore, the humidity-control may be either dehumidification or humidification. For example, in the case of room air-conditioning, the humidity-control may be conducted for the purpose of dehumidification in the high-humidity summer season, or for the purpose of humidification in the low-humidity winter season. Also, the humidity-control air conditioners may be of either a fixed type or a movable type as long as the apparatuses have a dehumidifying or humidifying function. Examples of the humidity-control air conditioners may include desiccant air conditioners fixed in buildings, small-scale dehumidifiers or humidifiers disposed within room, etc.

In the case of the humidity-control air conditioners, similarly to the adsorption heat pump, the operable vapor pressure range is also determined by a desorption-side relative vapor pressure ($\phi 1$) and an adsorption-side relative vapor pressure ($\phi 2$). However, since the humidity-control air conditioner are generally operated with air under atmospheric pressure, the desorption-side relative vapor pressure ($\phi 1$) and the adsorption-side relative vapor pressure ($\phi 2$) are respectively calculated from the following formulae.

Desorption-side relative vapor pressure ($\phi 1$)=
Absolute humidity of air treated/saturated vapor pressure at a treating temperature
Adsorption-side relative vapor pressure ($\phi 2$)=
Absolute humidity of air before treatment/saturated vapor pressure at a temperature before treatment That is, the relative humidity of air before treatment and the relative humidity of air treated are regarded as the respective relative vapor pressures.

As an example of the humidity-control air conditioning, in the case of dehumidification air conditioning in the summer season, which is generally performed under such room conditions including a dry-bulb temperature of 27° C. and a wet-bulb temperature of 19° C. as prescribed in JIS-C9612, etc., the relative humidity is about 50%. On the other hand, in JIS-C9612, it is also described that an outside absolute humidity in the summer season is 21 g/kg. When the air is heated to 80° C., the relative humidity thereof is reduced to about 7%. In this procedure, the adsorbent is alternately contacted with air having a relative humidity of 7% and air having a relative humidity of 50%. In this case, the operable relative water vapor pressure range (range between the desorption-side relative vapor pressure ($\phi 1$) and the adsorption-side relative vapor pressure ($\phi 2$)) is from 0.07 to 0.5. The adsorbent is preferably made of a material exhibiting a large change in amount of water adsorption in this range.

However, in the dehumidification air conditioning, it is generally known that the relative humidity is temporarily decreased owing to generation of initial heat of adsorption. For this reason, in the actual procedure, the adsorbent is required to have a good adsorption performance even at a relative humidity of not more than 50%. Further, for the same reason as described as to the adsorption heat pump, the adsorbent is preferably made of a material exhibiting a large change in amount of water adsorption in a narrow relative vapor pressure range. In the consideration of these facts, the adsorbent is more preferably made of such a material capable of adsorbing a larger amount of water vapor in a relative humidity range of 0.12 to 0.25 among the above operable humidity range.

In addition, similarly to the adsorption heat pump, in the humidity-control apparatuses, the amount of water adsorption of the adsorbent is preferably as large as possible, and the weight and volume of the adsorbent are preferably as small as possible. Therefore, the change in amount of water adsorption of the adsorbent is not less than 0.12 g/g, preferably not less than 0.135 g/g, more preferably not less than 0.14 g/g, most preferably not less than 0.15 g/g. When the change in amount of water adsorption of the adsorbent is small, the volume of the adsorbent as required tends to become large, resulting in disadvantageously large scale of the apparatus used. Further, the adsorbent is required to have such an operable relative vapor pressure range in which the change in amount of water adsorption thereof when changing the relative vapor pressure by 0.1 in a relative vapor pressure range of from 0.12 to 0.25 in a water vapor adsorption isotherm measured at a temperature of 25° C., is not less than 0.12 g/g. Among them, it is preferred that the adsorbent has such an operable relative vapor pressure range in which the change in amount of water adsorption thereof under the above conditions is not less than 0.15 g/g. The upper limit of the change in amount of water adsorption of the adsorbent is not particularly limited, and usually not more than about 0.3 g/g.

Also, from the viewpoint of adsorption performance, when the relative vapor pressure is 0.25 in the water vapor adsorption isotherm measured at a temperature of 25° C., the amount of water adsorption of the adsorbent is preferably not less than 0.12 g/g, more preferably not less than 0.15 g/g. The upper limit of the amount of water adsorption of the adsorbent is not particularly limited, and usually not more than 0.3 g/g. On the other hand, from the viewpoint of the desorption performance, when the relative vapor pressure is 0.1 in the water vapor adsorption isotherm measured at a temperature of 25° C., the amount of water adsorption of the adsorbent is preferably not more than 0.05 g/g, more preferably not more than 0.03 g/g, still more preferably not more than 0.02 g/g. The lower limit of the amount of water adsorption of the adsorbent is not particularly limited, and preferably not less than 0.00001 g/g.

The humidity-control air conditioners using the adsorbent exhibiting an appropriate difference in amount of water adsorption in such a range where the difference between the relative vapor pressures upon adsorption and desorption is small, are advantageously applicable to not only dehumidification in the summer season, but also humidity control requiring control to a specific humidity. Further, when the change in amount of water adsorption of the adsorbent is large even in a narrow relative humidity range, the adsorption and desorption of water can be rapidly performed, resulting in shortened adsorption and desorption cycle time as well as compactness of the apparatus used.

One feature of the present invention lies in that the adsorbent having the above properties is used as an adsorbent for an adsorber in the adsorption heat pump. That is, since a large change in amount of water adsorption is attained even in a narrow change in relative vapor pressure on the side of a comparatively low relative vapor pressure, the adsorbent is suitably applicable to the adsorption heat pump in which the lower limit of temperature of a low-temperature heat source is relatively high, for example, air conditioners for factories.

Also, another feature of the present invention lies in that the adsorbent having the above properties is used as an adsorbent for an adsorption portion in humidity-control air conditioners.

The adsorption heat pump and humidity-control air conditioner utilize as a driving source thereof, such a capability of the adsorbent of adsorbing an adsorbate therein and desorbing the adsorbate therefrom. In the adsorption heat pump and humidity-control air conditioner, the adsorbate in the form of a vapor is adsorbed in the adsorbent. As the adsorbate, there may be used water, ethanol, acetone, etc. Among these adsorbates, water is most preferred from the viewpoints of safety, low price and large latent heat of vaporization.

Next, the adsorbent is described more specifically. The absorbent for adsorption heat pump and humidity-control air conditioner according to the present invention comprises zeolite containing (i) aluminum, (ii) phosphorus and (iii) iron and/or gallium in a skeletal structure thereof, which is substantially free from change in structure upon subjecting the zeolite to adsorption and desorption of water vapor. It is required that the adsorbent used in adsorption heat pump and humidity-control air conditioner is stably subjected to repeated adsorption and desorption of water vapor. In this case, as described above, when the zeolite suffers from change in structure between the water vapor-adsorbed state and the water vapor-desorbed state, the repeated adsorption and desorption procedure causes large distortion in structure thereof, resulting in unstable structure and thereby failing to attain sufficient properties. Therefore, from the viewpoints of good performance of the adsorption heat pump and humidity-control air conditioner, in order to allow the zeolite to exhibit a high durability against the repeated adsorption and desorption of water vapor, it is important that the zeolite is substantially free from change in structure upon subjecting the zeolite to adsorption and desorption of water vapor.

The condition which is substantially free from change in structure upon subjecting the zeolite to adsorption and desorption of water vapor means that the results of the XRD (X-ray diffraction) measurement for the zeolite in water vapor-adsorbed state are substantially identical to those in water-desorbed state. Form more quantitative viewpoints, the above condition means that when the XRD measurement is conducted under the conditions described in Examples below, the difference between the position of top of maximum peak (maximum peak height) in adsorbed state as measured at a diffraction angle $2\theta$ of not more than 15° and that position in desorbed state is not more than 0.2° when expressed by the difference in diffraction angle $2\theta$.

The zeolite which is substantially free from change in structure upon subjecting the zeolite to adsorption and desorption of water vapor, can exhibit a high durability. The high durability of the zeolite means that the amount of water adsorption thereof at a relative humidity of 0.25 in the adsorption isotherm measured at a temperature of 25° C. after subjecting the zeolite to 1000 adsorption and desorption cycles under the durability test conditions described in Examples below is not less than 70%, preferably not less than 80%, more preferably not less than 90% of the amount of water adsorption of the zeolite before being subjected to the durability test.

In addition, the zeolite has a framework density of from more than 16.0 T/1000 Å$^3$ to 19.0 T/1000 Å$^3$. The lower limit of the framework density of the zeolite is preferably not less than 16.2 T/1000 Å$^3$, whereas the upper limit of the framework density of the zeolite is preferably not more than 19.0 T/1000 Å$^3$, more preferably not more than 18.0 T/1000 Å$^3$ Further, at least one pore structure in the zeolite is preferably constituted from an oxygen 8 or more-membered ring, more preferably an oxygen 10 or more-membered ring, most preferably an oxygen 12 or more-membered ring. When the pore structure in the zeolite is constituted from an oxygen 7 or less-membered ring, diffusion of water vapor from and into the pores tends to be insufficient, resulting in problems such as low adsorption or desorption velocity and large hysteresis of adsorption and desorption operations. As a result, there tends to be caused such a case where even though the adsorption is well performed, the desorption is hardly caused.

By selectively using the above zeolite, it is possible to achieve the above-mentioned adsorption performance. When the framework density of the zeolite is too small, although the difference in amount of water adsorption thereof tends to become large, there tend to be caused problems such as failed adsorption and desorption operations in an adequate relative humidity range and poor durability due to unstable structure thereof. When the framework density of the zeolite is too large, there tends to be caused such a risk that adsorption properties required in the present invention are not satisfied owing to too small difference in amount of water adsorption thereof. Here, the "framework density" means the number of atoms other than oxygen constituting the zeolite skeleton per 1000 Å$^3$ of the zeolite, and is determined by the structure of the zeolite. Meanwhile, the relationship between the framework density and the structure of the zeolite is described in "ATLAS OF ZEOLITE FRAMEWORK TYPES", Fifth Revised Edition, 2001, ELSEVIER.

Examples of the above zeolite structure may include AET, AFI, AFN, ANA, AST, ATN, ATS, ATT, BPH, BRE, CON, CZP, DFT, EDI, FER, LAU, LTL, MAZ, MEL, MFI, MOR, MWW, OSI, SAT, TER, VNI, VSV and ZON when expressed by codes prescribed by International Zeolite Association (IZA). Among these zeolite structures, preferred are AET, AFI, AST and ATS, and more preferred is AFI.

The framework density and pore volume of the zeolite have an interrelation to each other. In general, the smaller the framework density of the zeolite, the larger the pore volume thereof and, therefore, the larger the adsorption capability thereof. The zeolite having a smaller framework density is preferred from the standpoint of amount of adsorption as a whole and is suitable as an adsorbent used in a lower humidity condition. However, from the standpoint of adsorption performance in the relative vapor pressure range under a high humidity condition as required in the present invention, the zeolite having a small framework density is unsuitable, and rather the zeolite having a large framework density is suitable for the aim of the present invention. In the consideration of good balance between these requirements, the framework density of the zeolite used in the present invention preferably lies in the above-specified range.

The adsorbent of the present invention comprises zeolite containing (i) aluminum, (ii) phosphorus and (iii) iron and/or gallium in a skeletal structure thereof in which the iron and/or gallium is substituted for aluminum and/or phosphorus contained in the zeolite skeleton. Among these zeolites, preferred are zeolites in the form of crystalline iron aluminophosphate containing at least aluminum, phosphorus and iron in a skeletal structure thereof.

The preferred zeolite used as the adsorbent of the present invention contains aluminum, phosphorus, and iron and/or gallium in its skeletal structure, and have abundance ratios of atoms represented by the following formulae (1), (2) and (3):

$$0.001 \leq x \leq 0.3 \tag{1}$$

wherein x is a molar ratio of a sum of iron and gallium to a sum of aluminum, phosphorus, iron and gallium in the skeletal structure;

$$0.3 \leq y \leq 0.6 \tag{2}$$

wherein y is a molar ratio of aluminum to a sum of aluminum, phosphorus, iron and gallium in the skeletal structure; and $$0.3 \leq z \leq 0.6 \tag{3}$$

wherein z is a molar ratio of phosphorus to a sum of aluminum, phosphorus, iron and gallium in the skeletal structure.

Among zeolites satisfying the above abundance ratios of atoms, more preferred are those satisfying the abundance ratio of iron atom represented by following formula (4):

$$0.003 \leq x \leq 0.2 \tag{4},$$

wherein x has the same meaning as defined above, and still more preferred are those satisfying the abundance ratio of iron atom represented by following formula (5):

$$0.005 \leq x \leq 0.1 \tag{5}$$

wherein x has the same meaning as defined above.

The zeolite in the form of crystalline iron and/or gallium aluminophosphate used in the present invention may contain, in addition to Fe and/or Ga, Al and P, other elements in a skeletal structure thereof. Examples of the other elements may include silicon, lithium, magnesium, titanium, zirconium, vanadium, chromium, manganese, cobalt, nickel, palladium, copper, zinc, germanium, arsenic, tin, calcium and boron. The molar ratio of the other elements (M) to iron (Fe) and/or gallium (Ga) (M/Fe and/or Ga) is usually not more than 3, preferably not more than 1.5, more preferably not more than 0.5. When the molar ratio (M/Fe and/or Ga) is out of the above-specified range, the zeolite may fail to exhibit satisfactory adsorption properties aimed by the present invention.

The respective molar ratios of the above atoms are determined by elemental analysis. The elemental analysis is usually conducted by dissolving the sample in an aqueous hydrochloric acid solution under heating and subjecting the resultant solution to ICP analysis.

Further, the adsorbent used in the present invention exhibits such an operable relative vapor pressure range in which the change in amount of water adsorption thereof, when changing the relative vapor pressure by 0.1 in a relative vapor pressure range of from 0.12 to 0.25 in a water isotherm measured at a temperature of 25° C., is not less than 0.12 g/g, preferably not less than 0.135 g/g, more preferably not less than 0.14 g/g, most preferably not less than 0.15 g/g. Further, the adsorbent used in the present invention preferably exhibits such an operable relative vapor pressure range in which the change in amount of water adsorption thereof when changing the relative vapor pressure by 0.08 in a relative vapor pressure range of from 0.14 to 0.22, is not less than 0.12 g/g, preferably not less than 0.135 g/g, more preferably not less than 0.14 g/g, most preferably not less than 0.15 g/g. When the adsorbent having the above adsorption properties is applied to the adsorption heat pump, it is possible to operate the adsorption heat pump using the low-temperature side heat source having a temperature of not less than 30° C. and the high-temperature side heat source having a temperature of not more than 80° C. as described above. Thus, by using such an adsorbent having a large difference in amount of water adsorption between the high- and low-temperature sides, the adsorption heat pump can be reduced in size.

The upper limit of the change in amount of water adsorption of the adsorbent when changing the relative vapor pressure by 0.1 is suitably as high as possible, and usually not more than 0.3 g/g owing to limited materials for the adsorbent, whereas the upper limit of the change in amount of water adsorption of the adsorbent when changing the relative vapor pressure by 0.08 is usually not more than 0.29 g/g.

In addition to the above conditions, the adsorbent used in the present invention more preferably exhibits an amount of water adsorption of not more than 0.05 g/g at a relative vapor pressure of 0.1 which is the lower limit as defined in the present invention, as well as an amount of water adsorption of not less than 0.15 g/g at a relative vapor pressure of 0.25 which is the upper limit as defined in the present invention.

The adsorbents for adsorption heat pump and humidity-control air conditioner are substantially made of the above zeolite. Although the zeolite itself has a function as the adsorbent for adsorption heat pump and humidity-control air conditioner, the zeolite may also be used in combination with other adsorbents unless the adsorption performance is adversely affected by addition thereof to provide the adsorbent for the above purpose. Further, the adsorbent of the present invention may also contain other components such as binders, if required, upon actual use.

Next, the preferred embodiments of the adsorbent according to the present invention are explained by the relationship between the adsorption temperature (Ta), desorption temperature (Td) and temperature of cold generated (Tcool) of the adsorbent, and the difference in amount of water adsorption thereof.

In the preferred embodiments of the present invention, the adsorption heat pump is used under a relatively high temperature environmental condition, and, therefore, the adsorption temperature (Ta) of the adsorbent used therein is preferably from 25 to 45° C. The upper limit of the adsorption temperature (Ta) is determined by an outside temperature in the summer season. Assuming that the outside temperature in the summer season is from about 30 to 38° C., the upper limit of the adsorption temperature (Ta) is set to about 40 to 45° C. in the consideration of change in conditions such as location of installation of cogeneration apparatuses. The lower limit of the adsorption temperature (Ta) is not particularly limited. For example, assuming that a solid polymer-type fuel cell fitted to domestic cogeneration apparatuses is operated in the morning in the summer season and under a relatively high temperature environmental condition, the lower limit of the adsorption temperature (Ta) is usually from 25 to 30° C., preferably not less than 30° C. More specifically, the adsorption temperature (Ta) is generally from 25 to 45° C., preferably from 30 to 43° C., more preferably from 35 to 40° C.

The desorption temperature (Td) of the adsorbent has the relation to the above adsorption temperature (Ta) which is represented by the following formula (I):

$$Ta+28°\ C. \leq Td \leq 100°\ C. \tag{I}$$

The reason for defining the desorption temperature (Td) in the above-specified range is as follows. That is, the desorption temperature (Td) is determined by the temperature of exhaust heat used. For example, although the temperature of exhaust heat generated from fuel cells is about 70 to 80° C., since the exhaust heat is actually used after thermal conversion thereof, the temperature of usable heat is lower by about 10° C. than the temperature of the actual exhaust heat. Therefore, the lower limit of the desorption temperature is set to such a temperature after the thermal conversion, i.e., Ta+28° C. which is the difference from the adsorption temperature (Ta). The upper limit of the desorption temperature (Td) is 100° C. The desorption temperature (Td) exceeding a boiling point of water tends to be practically unusable because problems in apparatuses used are caused, and the temperature is higher than that of exhaust heat actually supplied. The specific range of the desorption temperature (Td) is usually from 58 to 85° C., preferably from 60 to 80° C., more preferably from 60 to 75° C. in the consideration of general environmental conditions under which the exhaust heat is utilized.

On the other hand, the temperature of cold generated (Tcool) lies in the range represented by the following formula (II):

$$Ta-25°\ C. \leq Tcool \leq 25°\ C. \tag{II}$$

The above temperature of cold generated (Tcool) means a temperature of the adsorbate which is cooled by removing a latent heat of vaporization therefrom upon being adsorbed in the adsorbent, i.e., an average temperature of water before and after adsorbed. The temperature of cold generated (Tcool) is univocally determined from the relation between mass of the adsorbate and the amount of the adsorbate adsorbed. The lower temperature of cold generated (Tcool) is more valuable in view of production heat, and the lower limit thereof is determined on the basis of the value of the usable temperature. Substantially, for the purpose of operating the adsorption heat pump, it is required that the temperature of cold generated (Tcool) exceeds (Ta−25° C.). On the other hand, as long as the temperature of cold generated (Tcool) is less than 25° C., it is practically usable as cold heat. The lower limit of the temperature of cold generated (Tcool) is preferably 5° C., more preferably 7° C. The upper limit of the temperature of cold generated (Tcool) is preferably 20° C., more preferably 15° C.

One of the other properties required for the adsorbent is the difference between the amount of water vapor adsorption at the adsorption temperature (Ta) and the amount of water vapor adsorption at the desorption temperature (Td) (hereinafter referred to as "temperature-dependent difference in amount of water adsorption"). The temperature-dependent difference in amount of water adsorption means a difference between (a) an amount of water adsorption at a relative humidity (adsorption-side relative vapor pressure) determined from the temperature of cold generated (Tcool) and the adsorption temperature (Ta), and (b) an amount of water adsorption at relative humidity (desorption-side relative vapor pressure) determined from the adsorption temperature (Ta) and the desorption temperature (Td), which are respectively measured by using (i) an adsorption isotherm at the adsorption temperature (Ta) and (ii) an adsorption isotherm at the desorption temperature (Td).

In the preferred embodiment of the present invention, the temperature-dependent difference in amount of water adsorption is not less than 0.1 g/g [g.H$_2$O/g-adsorbent], preferably not less than 0.12 g/g, more preferably not less than 0.135 g/g, still more preferably not less than 0.14 g/g, most preferably not less than 0.15 g/g. When the temperature-dependent difference in amount of water adsorption is less than the above-specified range, the volume of the adsorbent required tends to be increased, resulting in large scale of the apparatus used. The upper limit of the temperature-dependent difference in amount of water adsorption is not particularly limited, and usually not more than about 0.3 g/g in the consideration of limited materials of the adsorbent.

The adsorbent according to the above preferred embodiment of the present invention, which exhibits the above adsorption properties can operate the adsorption heat pump even under severe conditions in which the low-temperature side heat source temperature is not less than 30° C. and the high-temperature side heat source temperature is not more than 60° C., or even under severe conditions in which the low-temperature side adsorption condition is not less than 45° C. and the high-temperature side desorption condition is not more than 75° C., as described above. Further, since the adsorbent has a large difference in amount of water adsorption, the adsorption heat pump can have a more compact size.

In addition, since the adsorbent of the present invention is a heat-accumulating material, the properties thereof can be defined by output thereof. More specifically, the output density of the adsorbent (output per unit mass) is specified by the above temperature-dependent difference in amount of water adsorption, latent heat of vaporization of water and adsorption and desorption cycles in the adsorption heat pump. For example, when the temperature-dependent difference in amount of water adsorption is 0.12 g/g, the latent heat of vaporization of water is about 2500 kJ/kg, and water is adsorbed in a cycle time of 10 min, the output density of the adsorbent is 0.5 kW/kg as calculated according to the following formula. The output density of the adsorbent is preferably as large as possible similarly to the temperature-dependent difference in amount of water adsorption. However, the output density of the adsorbent is not more than about 1.5 kW/kg owing to limited materials of the adsorbent as well as limited design of adsorption cycle of the adsorption heat pump.

Output Density of Adsorbent =

(Temperature-Dependent Difference in Amount of Water Adsorption) ×

(Latent Heat of Vaporization)/Cycle Time =

$$0.12 \times 2500/600 = 0.5 \text{ kW/kg}$$

Also, the output density of the adsorbent is to be designed in the consideration of the scale of apparatus when actually operating the adsorption heat pump. Usually, the adsorption heat pump is proved with at least two adsorbers (adsorbing module) for conducting adsorption and desorption of the adsorbate, thereby continuously exhibiting an adsorption function in a whole apparatus by switching the operation between these adsorbers. Besides, the respective adsorbers have such a structure in which a heat-exchanging member constituted of a number of fins attached with an adsorbent is accommodated in a closed container, for example, as described in Japanese Patent Application Laid-Open (KOKAI) No. 2001-213149. The respective adsorbers have a portion occupied by the adsorbent and a portion occupied by the heat-exchanging member itself, and the volume occupied by the adsorbent in the respective adsorbers is substantially about 50%.

Therefore, in the consideration of the actual scale of the adsorbers, the packing density of the adsorbent in the respective adsorbers is 800 kg/m$^3$ at maximum and 500 kg/m$^3$ at minimum, and 600 kg/m$^3$ in average. Therefore, when the output density of the adsorbent is 0.5 kW/kg, the output density per unit volume required for the respective adsorbers is about 150 kW/m$^3$ according to the following formula. The upper and lower limits of the output densities of the respective adsorbers vary depending upon the output density of the adsorbent, and the output density is usually about 150 to 450 kW/m$^3$.

Output Density of Adsorber (Adsorbing Module):

(Output Density of Adsorbent) × (Packing Density) ×

(Ratio of Volume Occupied by Adsorbent) =

$$0.5 \times 600 \times 0.5 = 150 \text{ kW/m}^3$$

Also, it is important that the output density of the adsorbent is determined in the consideration of an output density of the adsorption heat pump as a whole system. As described in the above prior arts, the adsorption heat pump is equipped with, in addition to the above adsorbers, an evaporator for extracting cold heat generated by evaporation of the adsorbate outside, and a condenser for condensing a vapor of the adsorbate desorbed from the adsorber and releasing warm heat generated by condensation of the vapor of the adsorbate outside. As described by the present inventors in Japanese Patent Application Laid-Open (KOKAI) No. 2002-372332, it is required that the output density of the above respective adsorbers is designed so as to be about 1.5 times the output density of the adsorption heat pump though it varies depending upon the length of a conduit connecting the evaporator with adsorber, a conduit connecting the adsorber with the condenser, etc. Accordingly, in the case where the output density of the respective adsorbers is 150 kW/m$^3$, the output density of the adsorption heat pump is 100 kW/m$^3$. The output density of the adsorption heat pump is usually designed so as to lie in the range of about 100 to 300 kW/m$^3$.

Next, the process for production of the above iron and/or gallium aluminophosphate is explained. The conditions for production of the iron and/or gallium aluminophosphate used in the present invention are not particularly limited. Usually, the iron and/or gallium aluminophosphate may be produced by mixing a template with an aluminum source, a phosphorus source and an iron and/or gallium source, and then subjecting the resultant mixture to hydrothermal synthesis. In the following, an example of the production of the iron and/or gallium aluminophosphate is described.

First, the aluminum source, phosphorus source and iron and/or gallium source are mixed with the template. Examples of the aluminum source are not particularly limited and may usually include pseudo-boehmite, aluminum alkoxides such as aluminum isopropoxide and aluminum triethoxide, aluminum hydroxide, alumina sol, sodium aluminate, etc. Among these aluminum sources, pseudo-boehmite is preferred from the standpoint of good handing property and high reactivity.

Examples of the iron source are also not particularly limited, and may usually include iron salts of inorganic acids such as iron sulfate, iron nitrate, iron phosphate, iron chloride and iron bromide, iron salts of organic acids such as iron acetate, iron oxalate and iron citrate, iron-containing organic metal compounds such as iron penta-carbonyl and ferrocene, etc. Among these iron sources, preferred are iron salts of inorganic acids and iron salts of organic acids from the standpoints of good water solubility, and more preferred are inorganic acid iron compounds such as ferric nitrate and ferrous sulfate. In some cases, there may also be used colloidal iron hydroxides, etc.

Examples of the gallium source are also not particularly limited, and may usually include gallium sulfate, gallium nitrate, gallium phosphate, gallium chloride, gallium bromide, gallium hydroxide, etc. Among these gallium sources, preferred are gallium nitrate and gallium chloride.

As the phosphorus source, there may be usually used phosphoric acid, and there may also be used aluminum phosphate. Also, the iron and/or gallium aluminophosphate may also contain in its skeletal structure, the other elements unless the above adsorption and desorption properties are adversely affected by addition thereof. Examples of the other elements may include silicon, lithium, magnesium, titanium, zirconium, vanadium, chromium, manganese, cobalt, nickel, iron, palladium, copper, zinc, germanium, arsenic, tin, calcium and boron.

Examples of the template may include quaternary ammonium salts such as tetramethyl ammonium, tetraethyl ammonium, tetrapropyl ammonium and tetrabutyl ammonium; and primary, secondary and tertiary amines and polyamines such as morpholine, di-n-propylamine, tri-n-propylamine, triisopropylamine, triethylamine, triethanolamine, piperidine, piperazine, cyclohexylamine, 2-methylpyridine, N,N-dimethylbenzylamine, N,N-diethylethanolamine, dicyclohexylamine, N,N-dimethylethanolamine, coline, N,N'-dimethyl piperazine, 1,4-diazabicyclo(2,2,2)octane, N-methyldiethanolamine, N-methylethanolamine, N-methyl piperidine, 3-methyl piperidine, N-methylcyclohexylamine, 3-methylpyridine, 4-methylpyridine, quinuclidine, N,N'-dimethyl-1,4-diazabicyclo(2,2,2)octane ion, di-n-butylamine, neopentylamine, di-n-pentylamine, isopropylamine, t-butylamine, ethylenediamine, pyrrolidine, 2-imidazoline, di-isopropyl-ethylamine, dimethylcyclohexylamine, cyclopentylamine, N-methyl-n-butylamine and hexamethyleneimine. These templates may be used in the form of a mixture of any two or more thereof. Among these templates, from the standpoint of high reactivity, triethylamine, isopropylamine, diisopropylamine, tri-n-propylamine and tetraethyl ammonium hydroxide are preferred, and triethylamine is more preferred from the standpoint of industrial availability with more inexpensiveness. These templates may be used alone or in combination of any two or more thereof.

The above aluminum source, iron and/or gallium source, phosphorus source and template are mixed with each other in the form of an aqueous gel. Although the mixing order of the respective components varies depending upon the conditions, usually, the phosphorus source and aluminum source are first mixed with each other, and then the resultant mixture is mixed with the iron and/or gallium source and the template.

The aqueous gel of the iron and/or gallium aluminophosphate has such a composition that the molar ratio between constituting oxides is represented by the formula: $0.01 \leq FeO/P_2O_5 \leq 1.5$, and preferably $0.02 \leq FeO/P_2O_5 \leq 1.0$, more preferably $0.05 \leq FeO/P_2O_5 \leq 0.5$ from the standpoint of facilitated synthesis, wherein FeO represents $FeO+1/2Ga_2O_3$. The ratio of $P_2O_5/Al_2O_3$ is from 0.6 to 1.7, and preferably from 0.7 to 1.6, more preferably from 0.8 to 1.5 from the standpoint of facilitated synthesis. In addition, as to the lower limit of water content, the molar ratio of water to $Al_2O_3$ is not less than 3, and preferably not less than 5, more preferably not less than 10 from the standpoint of facilitated synthesis. As to the upper limit of water content, the molar ratio of water to $Al_2O_3$ is not more than 200, and preferably not more than 150, more preferably not more than 120 from the standpoints of facilitated synthesis and high productivity. The pH value of the aqueous gel is from 4 to 10, and preferably from 5 to 9, more preferably from 5.5 to 8.5 from the standpoint of facilitated synthesis.

Meanwhile, the aqueous gel may also contain components other than the above components, if required. Examples of the other components may include hydroxides or salts of alkali metals or alkali earth metals, hydrophilic organic solvents such as alcohols, etc.

The hydrothermal synthesis may be conducted by placing the aqueous gel in a pressure container and allowing the aqueous gel to stand with or without stirring at the predetermined temperature under a spontaneous pressure or under a pressure of gases having no adverse influence on crystallization thereof. The temperature condition of the hydrothermal synthesis is from 100 to 300° C., and preferably from 150 to 250° C., more preferably from 170 to 220° C. from the standpoint of facilitated synthesis.

The reaction time for the hydrothermal synthesis is from 3 hours to 30 days, and preferably from 5 hours to 15 days, more preferably from 7 hours to 7 days from the standpoint of facilitated synthesis. After completion of the hydrothermal synthesis, the reaction product is separated from the reaction mixture, washed with water, dried, and then calcined using air, etc., to remove a part or whole of organic substances contained therein, thereby obtaining a crystalline iron and/or gallium aluminophosphate.

One of features of the present invention lies in that the adsorbent having the above properties is used as an adsorbent for adsorbers of the adsorption heat pump or an adsorbent for adsorption and desorption portions of the humidity-control air conditioner. More specifically, since the adsorbent of the present invention exhibits a large difference in amount of water adsorption even upon changing the relative vapor pressure even in a narrow range on a comparatively low relative vapor pressure side, the adsorbent is suitably applicable to the adsorption heat pump or humidity-control air conditioner in which the lower limit of temperature of the low-temperature side heat source is relatively high, for example, air conditioners installed in factories.

Next, the adsorption heat pump as an application example of the above adsorbent according to the present invention is explained by referring to FIG. 1. FIG. 1 is a flow diagram showing an example of construction of the adsorption heat pump as an example of application of the adsorbent for adsorption heat pump according to the present invention.

The adsorption heat pump of the present invention utilizes the above adsorbent. As schematically shown in FIG. 1, the adsorption heat pump is constituted of adsorbers (1) and (2) composed of the adsorbent packed therein, which repeats operations of adsorbing an adsorbate in the adsorbent while releasing heat of adsorption generated outside and desorbing the adsorbate from the adsorbent by external warm heat, and which transferrs heat generated upon operation of adsorbing the adsorbate in the adsorbent to heating medium; an evaporator (4) for extracting cold heat obtained by vaporization of the adsorbate outside and recovering a vapor of the adsorbate generated, to the adsorbers (1) and (2); and a condenser (5) for condensing a vapor of the adsorbate desorbed in the adsorbers (1) and (2) by external cold heat, supplying the condensed adsorbate to the evaporator (4) and releasing warm heat obtained by condensation of the adsorbate outside.

The adsorbers (1) and (2) packed with the adsorbent are connected at respective inlet sides and outlet sides thereof with each other through adsorbate conduits (30) on which control valves (31) to (34) are disposed. Meanwhile, in the adsorbate conduits (30), the adsorbate exists in the form of a vapor solely or a mixture of liquid and vapor.

One adsorber (1) is connected to a heating medium conduit (11), whereas the other adsorber (2) is connected to a heating medium conduit (21). The heating medium conduit (11) is provided thereon with switching valves (115) and (116), whereas the heating medium conduit (21) is provided thereon with switching valves (215) and (216). The respective heating medium conduits (11) and (21) allow a heating medium as a heating source for heating the adsorbent packed in the adsorbers (1) and (2) or a heating medium as a cooling source for cooling the adsorbent to flow therethrough. As the heating medium, various media may be used as long as the adsorbent packed in the adsorbers (1) and (2) are effectively heated or cooled thereby.

Upon the desorption operation, for example, warm water is introduced into the adsorber (1) through the inlet (113) and discharged therefrom through the outlet (114) by opening and closing the respective switching valves (115) and (116). Also, upon the adsorption operation, for example, cooling water is introduced into the adsorber (1) through the inlet (111) and discharged therefrom through the outlet (112) by opening and closing the respective switching valves (115) and (116). On the other hand, as to the adsorber (2), upon the desorption operation, for example, warm water is introduced thereinto through the inlet (213) and discharged therefrom through the outlet (214) by opening and closing the respective switching valves (215) and (216). Also, upon the adsorption operation, for example, cooling water is introduced into the adsorber (2) through the inlet (211) and discharged therefrom through the outlet (212) by opening and closing the respective switching valves (215) and (216).

Meanwhile, although not shown in the figures, the heating medium conduits (11) and (21) are respectively connected to a heat source for generating the warm water and a pump for circulating the warm water in order to supply the warm water therethrough, or an outdoor device capable of heat-exchange with outside air for supplying the cooling water. As the heat source, there may be used cogeneration apparatuses such as gas engines and gas turbines, or fuel cells as described hereinlater.

The adsorbate conduits (30) disposed on an inlet side of the respective adsorbers (1) and (2) are connected to the evaporator (4), whereas the adsorbate conduits (30) disposed on an outlet side of the respective adsorbers (1) and (2) are connected to the condenser (5). More specifically, the above adsorbers (1) and (2) are arranged in parallel to each other between the evaporator (4) and the condenser (5), and further the evaporator (4) and the condenser (5) are connected to each other through a return conduit (3) for returning the adsorbate condensed in the condenser (5) to the evaporator (4). Meanwhile, the reference numeral (41) represents a cooling water conduit for producing an air cooling output from the evaporator (4) and the reference numeral (42) represents a cooling water conduit serving as an outlet of the cooling water. Between the cooling water conduits (41) and (42) are disposed an indoor device (300) for conducting heat-exchange with an indoor space (air-conditioning space) and a pump (301) for circulating the cooling water. Also, the reference numeral (51) represents an inlet conduit for feeding a cooling water to the condenser (5) and the reference numeral (52) represents an outlet conduit for discharging the cooling water from the condenser (5).

Next, the method of operating the above adsorption heat pump is described. In the first step, the control valves (31) and (34) are closed, and the control valves (32) and (33) are opened to conduct an adsorption operation in the adsorber (2) and simultaneously conduct a regeneration operation in the adsorber (1). Further, the switching valves (115), (116), (215) and (216) are actuated to allow warm water to flow through the heating medium conduit (11) and allow cooling water to flow through the heating medium conduit (21).

In the adsorption operation, the cooling water cooled by an external heat exchanger such as cooling towers is introduced through the heating medium conduit (21) to cool the adsorber (2). The temperature of the cooling water is determined by an ambient temperature, and is usually about 30 to 40° C. On the other hand, when the control valve (32) is opened, water (adsorbate) within the evaporator (4) is vaporized, and the resultant water vapor is flowed into the adsorber (2) and adsorbed by the adsorbent packed therein. The transfer of water vapor from the evaporator (4) to the adsorber (2) is performed by the difference between a saturated vapor pressure at the evaporation temperature and an adsorption equilibrium pressure corresponding to a temperature of the adsorbent (in general, 20 to 50° C., preferably 20 to 45° C., more preferably 30 to 40° C.). In the evaporator (4), it is possible to obtain cold heat corresponding to heat of vaporization owing to vaporization of water, i.e., an air cooling output.

The adsorption-side relative vapor pressure ($\phi 2$) (value obtained by dividing an equilibrium vapor pressure of the adsorbate at a temperature of cold water produced in the evaporator (4) by an equilibrium vapor pressure of the adsorbate at a temperature of cooling water in the adsorber (2)) is determined by the relationship between the temperature of the cooling water in the adsorber (2) and the temperature of the cold water produced in the evaporator (4). In general, the operation of the adsorption heat pump is preferably conducted such that the adsorption-side relative vapor pressure ($\phi2$) is larger than a relative vapor pressure at which the adsorbent adsorbs a maximum amount of water vapor therein. The reason therefor is as follows. That is, when the adsorption-side relative vapor pressure ($\phi2$) is smaller than the relative vapor pressure at which the adsorbent adsorbs a maximum amount of water vapor therein, the adsorbent may fail to effectively exhibit its adsorption performance, resulting in deteriorated operation efficiency of the heat pump. The adsorption-side relative vapor pressure ($\phi2$) may be appropriately determined according to environmental temperature, etc.

Thus, although the adsorption-side relative vapor pressure ($\phi2$) may be appropriately determined according to environmental temperature, etc., the operation of the adsorption heat pump is conducted under such a temperature condition that the amount of water adsorption at the adsorption-side relative vapor pressure ($\phi2$) is usually not less than 0.12, preferably not less than 0.15.

In the regeneration operation, the adsorber (1) is heated by warm water having a temperature of usually 40 to 100° C., preferably 50 to 80° C., more preferably 60 to 80° C., still more preferably 60 to 70° C. The heating procedure enables the adsorbent packed in the adsorber (1) to have an equilibrium vapor pressure corresponding to the above temperature range and desorb water (adsorbate) under a saturated vapor pressure at a condensation temperature of 30 to 40° C. in the condenser (5) (temperature of the cooling water for cooling the condenser (5)). The thus desorbed water is transferred in the form of water vapor from the adsorber (1) to the condenser (5) in which the water vapor is condensed into water. Water produced in the condenser (5) is circulated and fed to the evaporator (4) through the return conduit (3).

The desorption-side relative vapor pressure ($\phi1$) (value obtained by dividing an equilibrium vapor pressure of the adsorbate at a temperature of the cooling water in the condenser (5) by an equilibrium vapor pressure of the adsorbate at a temperature of warm water) is determined by the relationship between the temperature of the cooling water in the condenser (5) and the temperature of the warm water. The operation of the adsorption heat pump is preferably conducted such that the desorption-side relative vapor pressure ($\phi1$) is smaller than a relative vapor pressure at which the adsorbent abruptly adsorbs water vapor therein. The reason therefor is as follows. That is, when the desorption-side relative vapor pressure ($\phi1$) is larger than the relative vapor pressure at which the adsorbent abruptly adsorbs water vapor therein, the adsorbent may fail to effectively exhibit its excellent adsorption performance.

Although the desorption-side relative vapor pressure ($\phi1$) may be appropriately determined according to environmental temperature, etc., the operation of the adsorption heat pump is conducted under such a temperature condition that the amount of water adsorption under the desorption-side relative vapor pressure ($\phi1$) is usually not more than 0.14, preferably not more than 0.10. Further, the operation of the adsorption heat pump is conducted such that the difference between the amount the adsorbate adsorbed under the desorption-side relative vapor pressure ($\phi1$) and the amount of the adsorbate adsorbed under the adsorption-side relative vapor pressure ($\phi2$) is usually not less than 0.12 g/g, preferably not less than 0.135 g/g, more preferably not less than 0.14 g/g, still more preferably not less than 0.15 g/g.

In the next second step, the control valves (31) to (34) and the switching valves (115), (116), (215) and (216) are changed-over such that the adsorber (1) performs an adsorption operation and the adsorber (2) performs a regeneration operation, thereby obtaining cold heat, in other words, an air cooling output from the evaporator (4) similarly to the first step. That is, in the second step, the control valves (32) and (33) are closed and the control valves (31) and (34) are opened to simultaneously conduct the adsorption operation in the adsorber (1) and the regeneration operation in the adsorber (2). At this time, the switching valves (115), (116), (215) and (216) are actuated to allow warm water to flow through the heating medium conduit (21) and allow cold water to flow through the heating medium conduit (11).

As described above, by sequentially switching between the first and second steps, the adsorption heat pump can be operated continuously. Meanwhile, although the adsorption heat pump having the two adsorbers (1) and (2) is illustrated in FIG. 1, the number of the adsorbers used in the adsorption heat pump of the present invention is not particularly limited as long as the adsorbent appropriately desorbs the adsorbate adsorbed therein, and any of the adsorbers is kept in a state capable of adsorbing the adsorbate.

The above adsorption heat pump can be operated using a low-temperature exhaust heat as a heat source and, therefore, can be suitably applied to various systems such as cogeneration systems which require saving of energy.

Next, as application examples of the adsorption heat pump according to the present invention, a cold heat production system using exhaust heat generated from solid polymer-type fuel cells, a cold heat production system using warm heat generated from solar energy-assisted hot water suppliers, a cold heat production system using a low-temperature exhaust heat generated from engines, and a warm heat production system as well as the methods of operating these systems are described by referring to FIGS. 2 to 5.

Figure 2:
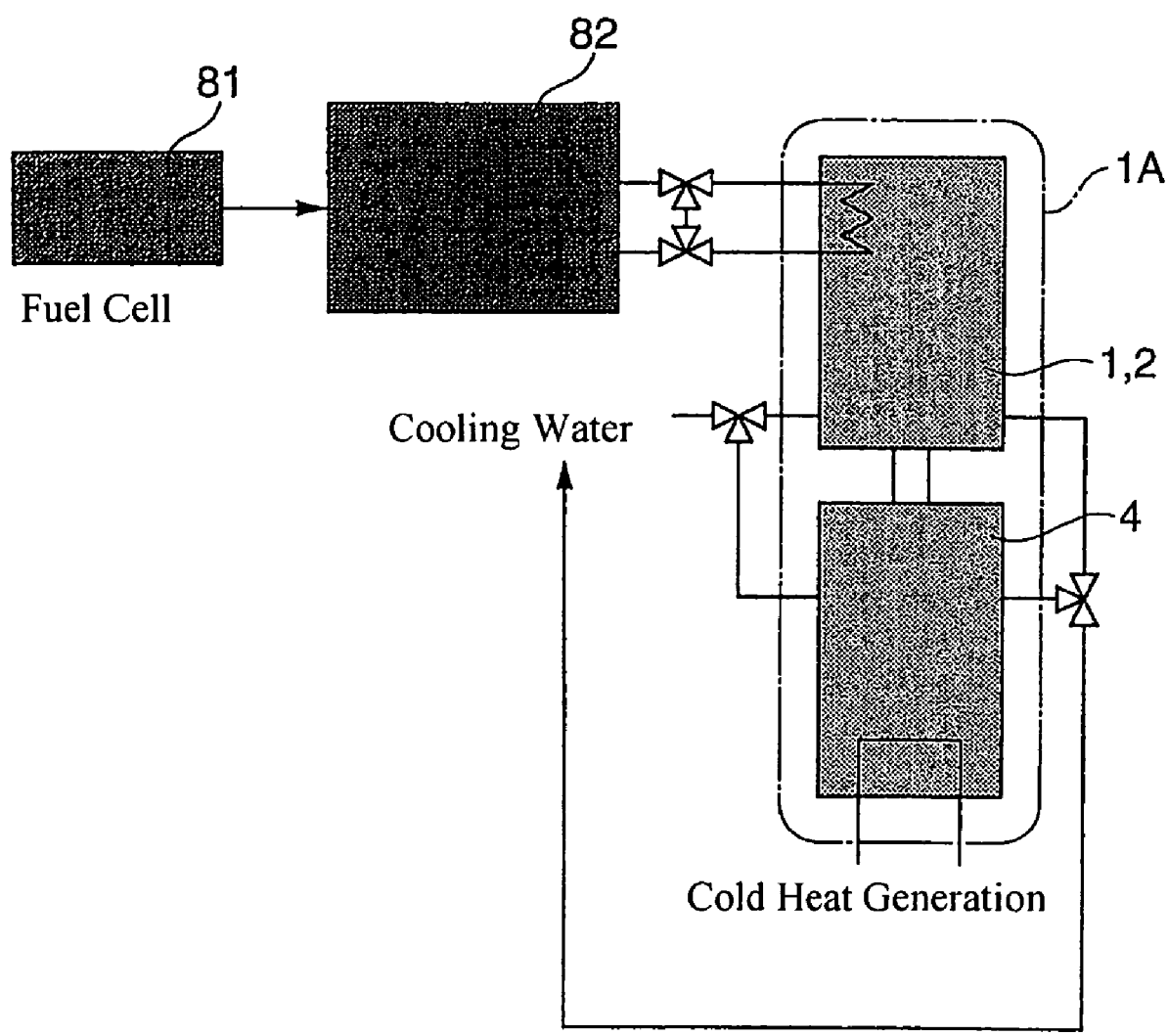
FIG. 2 is a view showing a construction of a cold heat production system using exhaust heat discharged from solid polymer-type fuel cells as a heat source of the adsorption heat pump.
Figure 3:
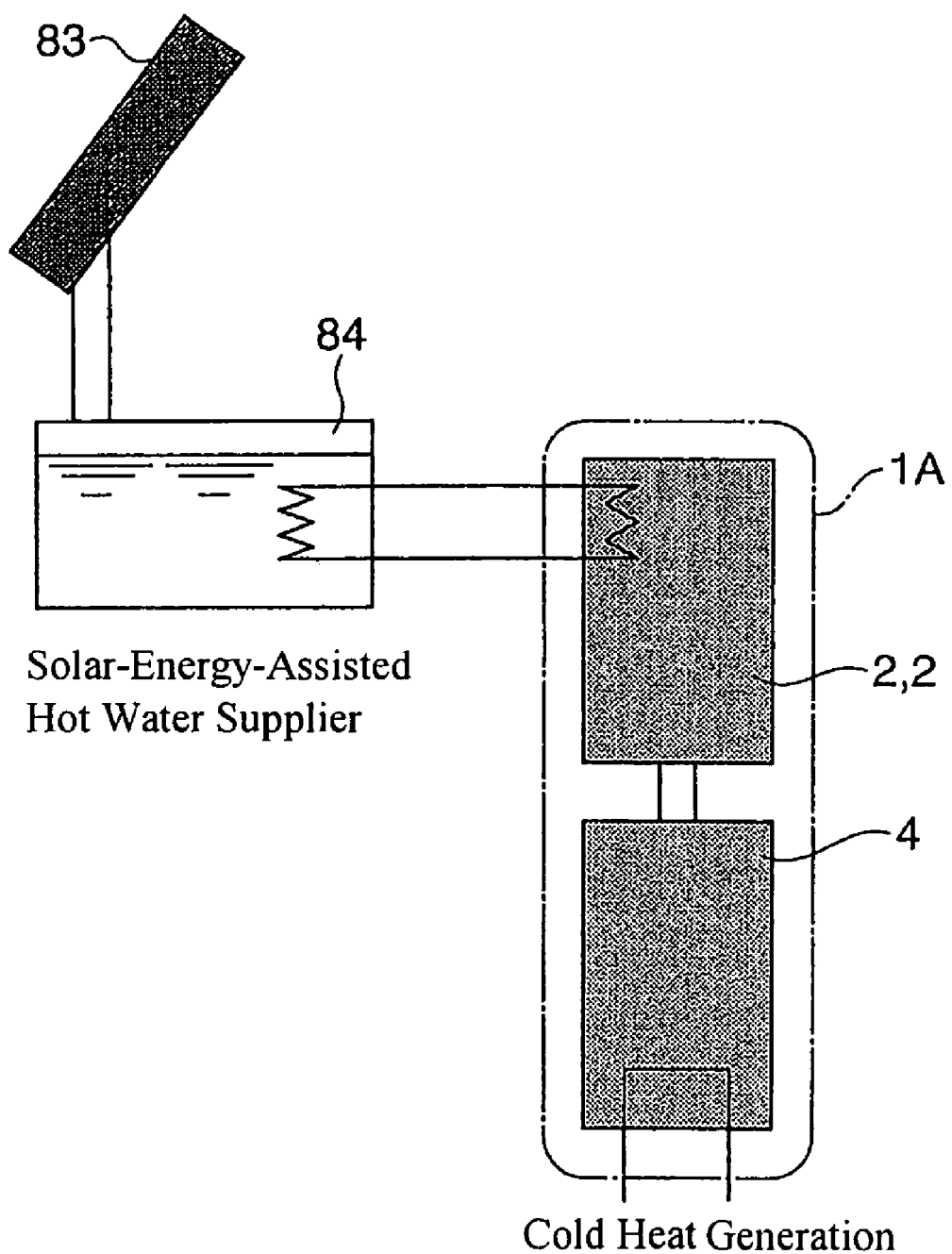
FIG. 3 is a view showing a construction of a cold heat production system utilizing warm heat discharged from a solar energy-assisted hot water supplier as a heat source of the adsorption heat pump.
Figure 4:
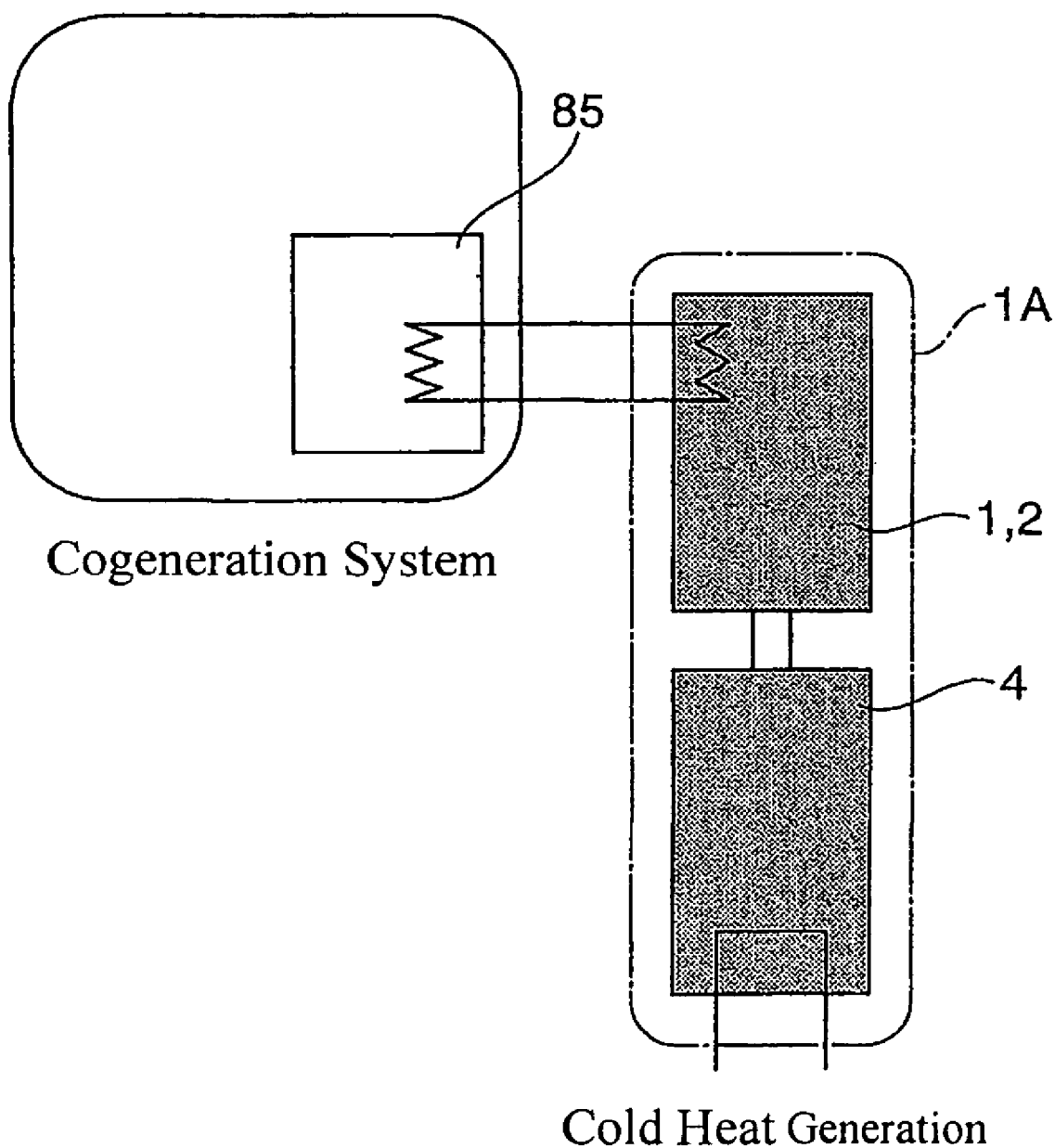
FIG. 4 is a view showing a construction of a cold heat production system utilizing low-temperature exhaust heat discharged from engines as a heat source of the adsorption heat pump.
Figure 5:
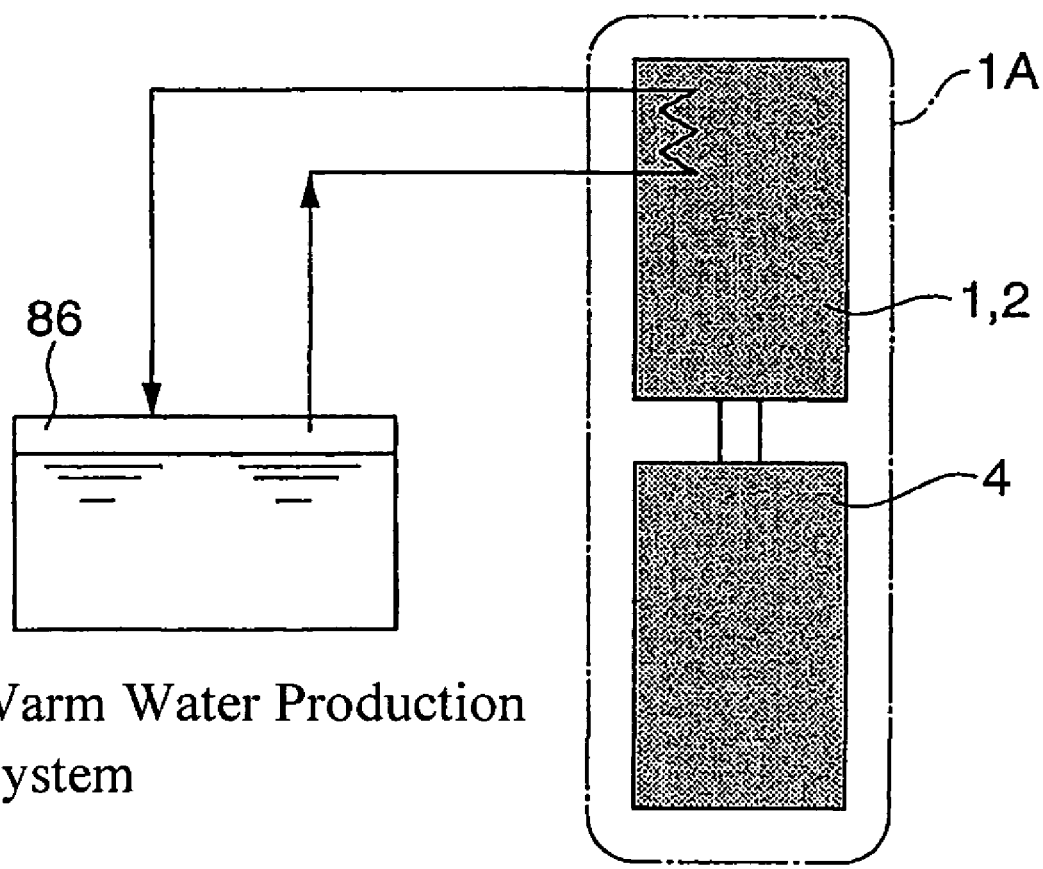
FIG. 5 is a view showing a construction of a warm heat production system using the adsorption heat pump.

FIG. 2 is a view showing a construction of the cold heat production system using exhaust heat generated from solid polymer-type fuel cells as a heat source of the adsorption heat pump according to the present invention. FIG. 3 is a view showing a construction of the cold heat production system using warm heat generated from solar energy-assisted hot-water suppliers. FIG. 4 is a view showing a construction of the cold heat production system using low-temperature exhaust heat generated from engines. FIG. 5 is a view showing a construction of the warm heat production system using the adsorption heat pump according to the present invention. Meanwhile, in FIGS. 2 to 5, the adsorption heat pump of the present invention is represented by reference numeral (1A).

The cold heat production system shown in FIG. 2 is a cogeneration system into which a solid polymer-type fuel cell (PEFC) (81) is incorporated as a domestic power source. The systems of such a type are described in Japanese Patent Application Laid-Open (KOKAI) Nos. 6-74597(1994) and 2001-213149, etc. PEFC (81) has an efficiency of power generation of about 40%, and a total efficiency thereof is increased up to about 80% by efficiently using exhaust heat thereof. Therefore, there have been proposed various methods for effectively utilizing exhaust heat from PEFC. However, since the exhaust heat from PEFC has a temperature as low as not more than 80° C., the exhaust heat is usable only in less application fields. Accordingly, it has been demanded to develop methods of effectively utilizing such a low-temperature exhaust heat.

As shown in FIG. 2, in the present invention, heat having a temperature of not more than 80° C. which is discharged from PEFC (81) is utilized in the adsorption heat pump (1A). That is, in the adsorption heat pump (1A) of the present invention, the adsorbers (1) and (2) are so constructed as to use low-temperature exhaust heat generated from the solid polymer-type fuel cell (PEFC) (81) as external warm heat. More specifically, exhaust heat generated from PEFC (81) is recovered by a heat exchanger (82), and, for example, warm water generated in the heat exchanger (82) is introduced into the adsorbers (1) and (2) and used therein as a heating source for desorbing water (adsorbate) from the adsorbent. Meanwhile, in the adsorbers (1) and (2), since it is required to remove heat of adsorption upon adsorbing the adsorbate therein, a cooling water is flowed therethrough to conduct heat change therewith. The supply of such a cooling water may be generally performed by the method of circulating a refrigerant as cold heat source such as waste water from radiator of automobiles and tap water. In some cases, external cold water may be used as the refrigerant.

The adsorption heat pump (1A) is a cold heat production apparatus. Therefore, by incorporating the adsorption heat pump into the system as shown in FIG. 2, cold heat production is possible using exhaust heat. In addition, in conventional cold heat production equipments, it has been required to use a compressor for compressing the refrigerant. On the other hand, in the system shown in FIG. 2, neither apparatuses such as compressors nor other powers are required, so that saving of electric power can be efficiently accomplished. Further, since water can be used as a heating medium, the system is favorable for environment from the viewpoint of flon-free techniques.

In the cold heat production system shown in FIG. 3, cold heat is produced using warm heat generated from a solar energy-assisted hot water supplier. The solar energy-assisted hot water supplier systems are described in Japanese Patent Application Laid-Open (KOKAI) No. 63-118564(1988), etc. The above hot water supplier systems are provided with a heat collecting circuit including a heat collector (83), and a hot water supplying circuit including a hot water storage tank (84). In this system, the temperature of hot water received in the hot water storage tank (84) and the temperature of water replenished are detected by sensors to control an amount of water circulated from the hot water storage tank (84) to the heat collector (83) by a pump, thereby enabling a constant amount of hot water having a constant temperature to be always stored in the hot water storage tank (84). Inherently, warm heat stored in the hot water storage tank (84) is sufficiently usable for hot water supply as needed. However, the amount of hot water needed varies depending upon seasons. More specifically, in the winter season, the warm heat is sufficiently utilized, whereas in the summer season, the need of heat is reduced, resulting in surplus of the warm heat. As a result, there is the present status that saving of energy is not sufficiently achieved.

As shown in FIG. 3, in the present invention, warm heat of hot water stored in the hot water storage tank (84) is used in the adsorption heat pump (1A). That is, in the adsorption heat pump (1A) of the present invention, the adsorbers (1) and (2) is so constructed as to use a surplus of warm heat stored in the hot water storage tank (84), in other words, a low-temperature exhaust heat generated from the solar energy-assisted hot water supplier as external warm heat. More specifically, the warm heat of hot water stored in the hot water storage tank (84) is recovered by a heat exchanger having a bellows tube structure, and, for example, warm water generated in the heat exchanger is introduced into the adsorbers (1) and (2) and used therein as a heating source for desorbing water (adsorbate) from the adsorbent. Meanwhile, in order to remove heat of adsorption in the adsorbers (1) and (2), there may also be used various cooling waters as described above. Further, water freshly supplied to the hot water storage tank (84) may also be used as the cooling water.

When the adsorption heat pump (1A) of the present invention is incorporated into the system shown in FIG. 3, cold heat production is possible using the surplus of heat. That is, by utilizing the surplus of warm heat remaining in the summer season, air cooling can be efficiently performed. In addition, the use of the surplus of heat generated in the hot water supplier system can further promote saving of energy. Furthermore, in the system shown in FIG. 3, since neither apparatuses such as compressors nor other powers are required, saving of electric power can be accomplished. Besides, since water can be used as a heating medium, the system is favorable for environment from the viewpoint of flon-free techniques.

The cold heat production system shown in FIG. 4 is a low-temperature exhaust heat utilization system established in a gas-turbine cogeneration system for performing not only power generation but also production of water vapor, warm water or cold water using an internal combustion engine. The gas-turbine cogeneration system is described in Japanese Patent Application Laid-Open (KOKAI) No. 2002-266656, etc. As well known in the art, in such a system, for example, power generation is performed by a generator driven by a gas turbine (internal combustion engine), and heat of combustion exhaust gas discharged from the gas turbine is recovered by a exhaust heat recovering boiler to generate water vapor. The water vapor supplied from the exhaust heat recovering boiler is then used as a driving heat source of an absorption-type refrigerator to produce cold water. In addition, heat of the exhaust gas passed through the exhaust heat recovering boiler (4) is further recovered by a warm water boiler to produce warm water, and the warm water produced in the warm water boiler is used as a driving heat source of an adsorption-type refrigerator (adsorption heat pump) to produce cold water.

As shown in FIG. 4, in the present invention, heat of the warm water recovered in the warm water boiler (85) is utilized for operating the adsorption heat pump (1A). That is, in the adsorption heat pump (1A) of the present invention, the adsorbers (1) and (2) is so constructed as to use the low-temperature exhaust heat generated from the internal combustion engine-assisted cogeneration system as external warm heat. More specifically, the warm heat is recovered by a heat exchanger of a bellows tube structure, etc., in the warm water boiler (85), and, for example, warm water as a heating medium is introduced from the heat exchanger into the adsorbers (1) and (2) and used therein as a heating source upon desorbing water (adsorbate) from the adsorbent. Meanwhile, in order to remove heat of adsorption in the adsorbers (1) and (2), there may also be used various cooling waters as described above.

When the adsorption heat pump (1A) of the present invention is incorporated into the cogeneration system shown in FIG. 4, the low-temperature exhaust heat of warm water which has been conventionally considered to have only a less applicability, can be more effectively used to produce cold heat at low costs. Further, in the above system, since water is used as a heating medium, the system is also favorable for environment. In addition, since no absorbing solution such as lithium bromide is required unlike the absorption-type refrigerators, maintenance of the system can be readily performed without troublesome procedures, resulting in reduction of costs for the maintenance. Moreover, since the system can be operated substantially simultaneously with the gas turbine, suitable measures can be rapidly taken upon variation of loads, etc.

The warm heat production system shown in FIG. 5 produces warm heat by using heat of adsorption generated in the adsorbent. In the adsorption heat pump (1A), as described above, in order to cause the adsorbent to exhibit a desired adsorption performance upon the adsorption operation, heat of adsorption must be removed by cooling water, etc., during normal operation thereof to decrease a temperature of the adsorbent. By effectively utilizing the heat of adsorption in the system, it is possible to produce warm heat.

That is, in the adsorption heat pump (1A) of the present invention, the adsorbers (1) and (2) are so constructed as to enable the heat of adsorption released upon the adsorption operation to be fed to warm heat-utilizing equipments. More specifically, the warm heat production system shown in FIG. 5 is mainly constituted from the adsorption heat pump (1A) and a hot water storage tank (86). In the warm heat production system, water stored in the warm water storage tank (86) is supplied as cooling water to the adsorbers (1) and (2) of the adsorption heat pump (1A), and warm water generated is returned from the adsorbers (1) and (2) to the hot water storage tank (86). Therefore, in the adsorption heat pump (1A) of the present invention, by constructing the system as shown in FIG. 5, cold heat can be produced in the evaporator (4), and the heat of adsorption generated in the adsorbers (1) and (3) can be used, for example, in the hot water storage tank (86) to produce warm water.

In the case where the size of the adsorption heat pump (1A) is determined on the basis of need of air cooling, the amount of producible warm heat is expressed by [(amount of heat adsorbed) x (efficiency of adsorption heat pump)]. The amount of heat adsorbed is calculated by [(amount of adsorption of adsorbent) x (weight of adsorbent) x (latent heat of vaporization of water) x (number of cycles per hour)]. Therefore, when calculated under the above conditions similarly to the cold heat production, the warm heat production capability of the adsorption heat pump (1A) is about 5.0 kW according to the following formula:

Warm Heat Production Capability (Warm Heat Output):

$$0.1 \text{ kg/kg} \times 12 \text{ kg} \times 2500 \text{ kJ/kg} \times 6 \text{ cycles/hour} = 18000 \text{ kJ}$$

As a result, assuming that a domestic hot water supplier has a general hot water supply capability (No. 24: 41.8 kW), energy consumed upon hot water supply can be saved by about 12% by using the above warm heat production system. That is, in the warm heat production system to which the adsorption heat pump (1A) is applied, when the warm heat (warm water) generated therein is supplied to domestic hot water suppliers, saving of energy can be more effectively accomplished, thereby increasing the energy efficiency. Meanwhile, the above warm heat production system may also be applied to air-conditioning equipments. In this case, it is possible to enhance an air-heating efficiency of the air-conditioning equipments.

Next, the humidity-control air conditioner using the above adsorbent according to the present invention is described.

Figure 6:
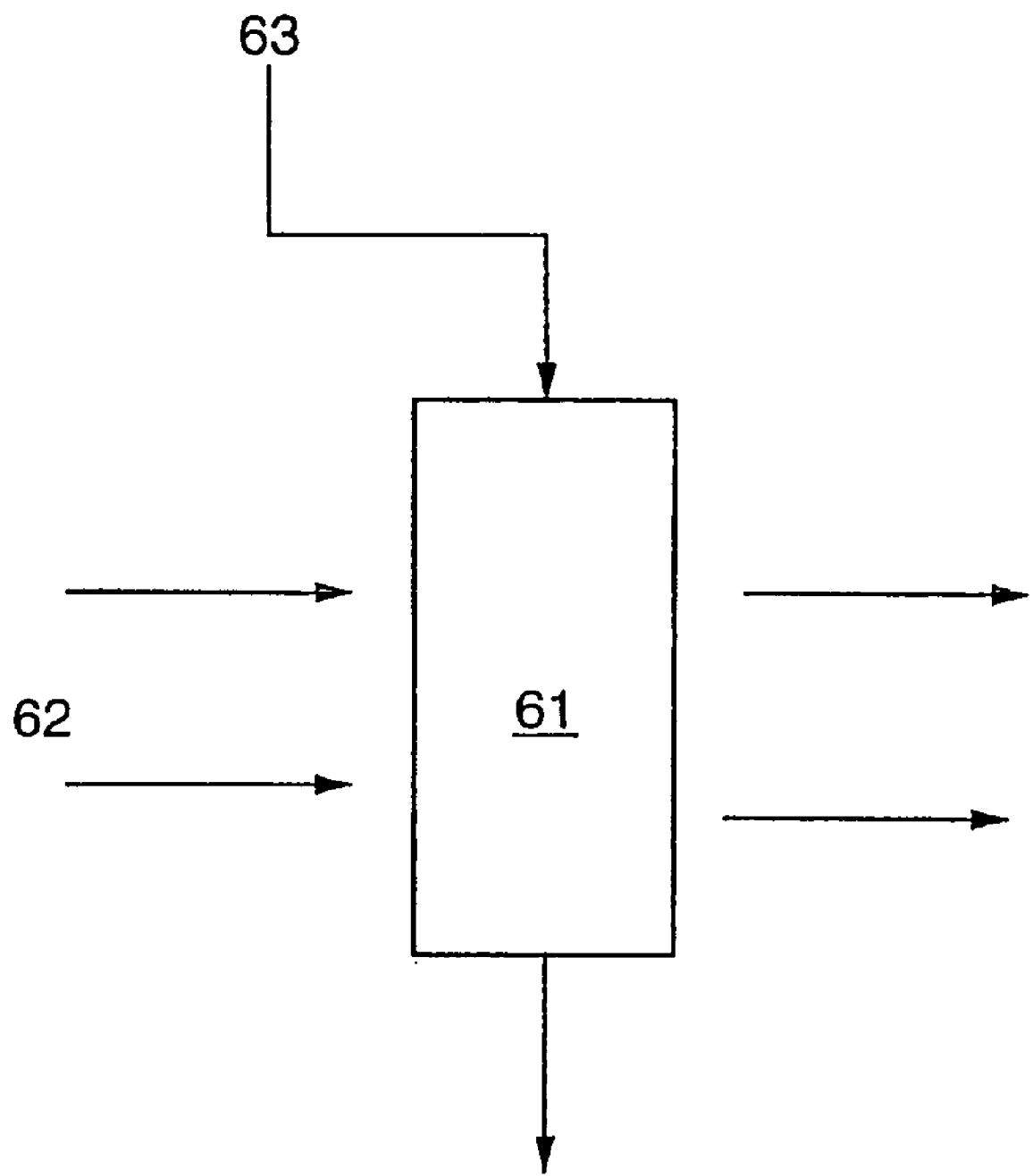
FIG. 6 is a view showing a principle of a humidity control apparatus.

First, the concept of the humidity-control air conditioner is explained by referring to FIG. 6. The humidity-control air conditioner shown in FIG. 6 comprises an adsorption section (61) as an adsorbing and desorbing section which is provided with an adsorbent capable of adsorbing an adsorbate therein and desorbing the adsorbent therefrom, a mechanism (63) for regenerating the adsorbent, and further optionally includes an air passage for allowing air (62) to be humidity-controlled to flow therethrough, or an apparatus for forcibly discharging the humidity-controlled air. The adsorption section may have any shape capable of sufficiently contacting the air to be humidity-controlled with the adsorbent, and may be of a rotor shape with a honeycomb structure, etc. The mechanism (63) for regenerating the adsorbent may be a heat supply mechanism capable of supplying heat having a temperature of about 80° C. required for regenerating the adsorbent to the adsorption section, for example, in the case of dehumidification. As the mechanism (63), in the case of generating heat by electric heating, etc., within the apparatus, there may be used heat sources such as heaters and heating coils, or mechanisms such as blowers for sufficiently transferring heat to the adsorption section, whereas in the case of obtaining heat from external heat sources disposed outside of the apparatus, there may be used conduits for supplying high-temperature gases, etc. The external heat sources are not particularly limited similarly to those used in the adsorption heat pump. Examples of the external heat sources may include cogeneration equipments such as gas engines and gas turbines, and fuel cells. For the purpose of humidification, there may be used a passage for allowing a high-humidity air serving for re-absorption of moisture to flow therethrough.

Next, the humidity controlling effect obtained by using the above humidity-control air conditioner is specifically described, though the present invention is not limited thereto.

Figure 7:
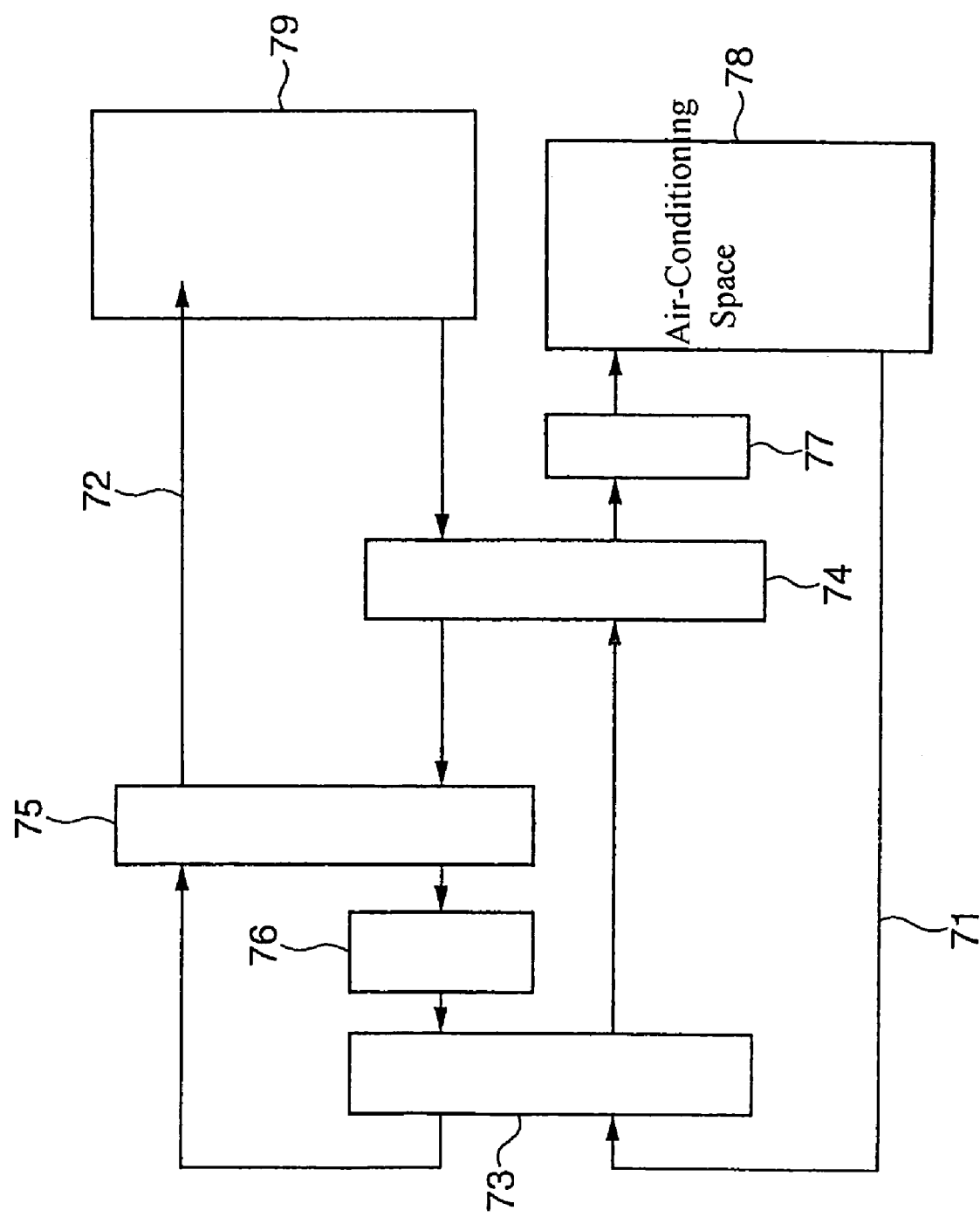
FIG. 7 is a conceptional view of a desiccant air conditioner.

FIG. 7 shows a conceptual view of a desiccant air conditioner as an example of the humidity-control air conditioner. The desiccant air conditioner is mainly constituted from a passage (71) for air to be treated, a regenerating air passage (72), a desiccant rotor (73) adhered with an adsorbent, two sensible heat exchangers (74) and (75), a heat supply mechanism (76) for supplying heat from a heating source, and a humidifier (77). In the desiccant air conditioner, air to be treated is dehumidified by the desiccant rotor (73), and a temperature of the air is raised by heat of adsorption generated upon adsorbing water in the adsorbent (desiccant). Thereafter, the air is cooled by heat exchange with the regenerating air in the first sensible heat exchanger (74), humidified in the humidifier (77), and then supplied to an air-conditioning space (78). On the other hand, the regenerating air is received from outside, and the temperature thereof is raised by heat exchange with the treated air in the first sensible heat exchanger (74). Thereafter, the regenerating air is heated by the heat supply mechanism (76) to reduce a relative humidity thereof, and then passed through the desiccant rotor (73) to desorb water from the adsorbent, thereby regenerating the adsorbent. The sensible heat of the regenerating air after the regeneration operation is recovered by heat exchange with the regenerating air before heating in the second sensible heat exchanger (75), and then discharged to an outside (79).

The above humidity-control air conditioner can be operated by using the low-temperature exhaust heat as a heat source and, therefore, can be applied to cogeneration systems, etc., which require saving of energy. Examples of applications of the humidity-control air conditioner may include humidity-control air-conditioning systems using exhaust heat from solid polymer-type fuel cells, warm heat form solar energy-assisted hot water suppliers, low-temperature exhaust heat from engines, etc., which may be constructed by replacing the adsorption heat pump described in application examples thereof with the humidity-control air conditioner.

As described above, the adsorbent of the present invention exhibits a large difference between amounts of water adsorption upon adsorption and desorption operations, and is capable of being regenerated (desorption) even at a low temperature. Therefore, the adsorbent can constitute an adsorption heat pump and a humidity-control air conditioner which can be operated by a heat source having a relatively low temperature not more than 80° C. Further, the adsorption heat pump and humidity-control air conditioner of the present invention using the adsorbent having the above specific adsorption properties can be efficiently operated by using a low-temperature heat source as compared to those used conventionally. In addition, according to the operating method of the present invention, since the adsorption heat pump and humidity-control air conditioner can be efficiently operated by low-temperature heat, it is possible to effectively utilize exhaust heat generated from cogeneration systems, etc., and accomplish further saving of energy.

EXAMPLES

The present invention is described in more detail by Examples, but the Examples are only illustrative and not intended to limit the scope of the present invention.

Example 1

9.5 g of pseudo-boehmite (containing 25% by weight of water: produced by Condea Coporation) was slowly added to a mixture of 38.4 g of water and 17.6 g of 85% phosphoric acid under stirring. The resultant mixture was stirred for 3 hours, and then mixed with an aqueous solution prepared by dissolving 6.78 g of ferrous sulfate heptahydrate in 36.6 g of water, and further with 10.8 g of triethylamine. The obtained mixture was stirred for 3 hours, thereby obtaining a raw reaction mixture having the following composition:

$0.32FeSO_4:0.92Al_2O_3:P_2O_5:1.4(triethylamine):60H_2O$

The thus obtained raw reaction mixture was charged into a 200 cc stainless steel autoclave enclosing an inner tube made of Teflon (registered trademark), and allowed to stand at 200° C. for 12 hours for conducting the reaction thereof. After completion of the reaction, the reaction solution was cooled and decanted to remove a supernatant solution therefrom, thereby recovering a precipitate. Then, the thus recovered precipitate was washed with water three times, separated by filtration, and then dried at 120° C. Then, 3 g of the thus obtained template-containing material was sampled, placed in a vertical quartz baking tube, heated to 550° C. at a temperature rise rate of 1° C./min under an air flow of 200 mL/min, and then continuously calcined at 550° C. for 6 hours under the same conditions, thereby obtaining a crystalline iron aluminophosphate. The thus obtained crystalline iron aluminophosphate was subjected to XRD (X-ray diffraction) measurement. As a result, it was confirmed that the crystalline iron aluminophosphate was a so-called FAPO-5 of an AFI type (framework density: 17.3 T/1000 Å$^3$). Meanwhile, the AFI structure was an oxygen 12-membered ring structure.

In addition, the obtained product was dissolved under heating in a aqueous hydrochloric acid solution, and subjected to ICA analysis for elemental analysis thereof. As a result, it was confirmed that the molar ratios of the respective components to a sum of aluminum, phosphorus and iron contained in the skeletal structure were 4.0% for iron, 46.7% for aluminum and 49.3% for phosphorus.

Figure 8:
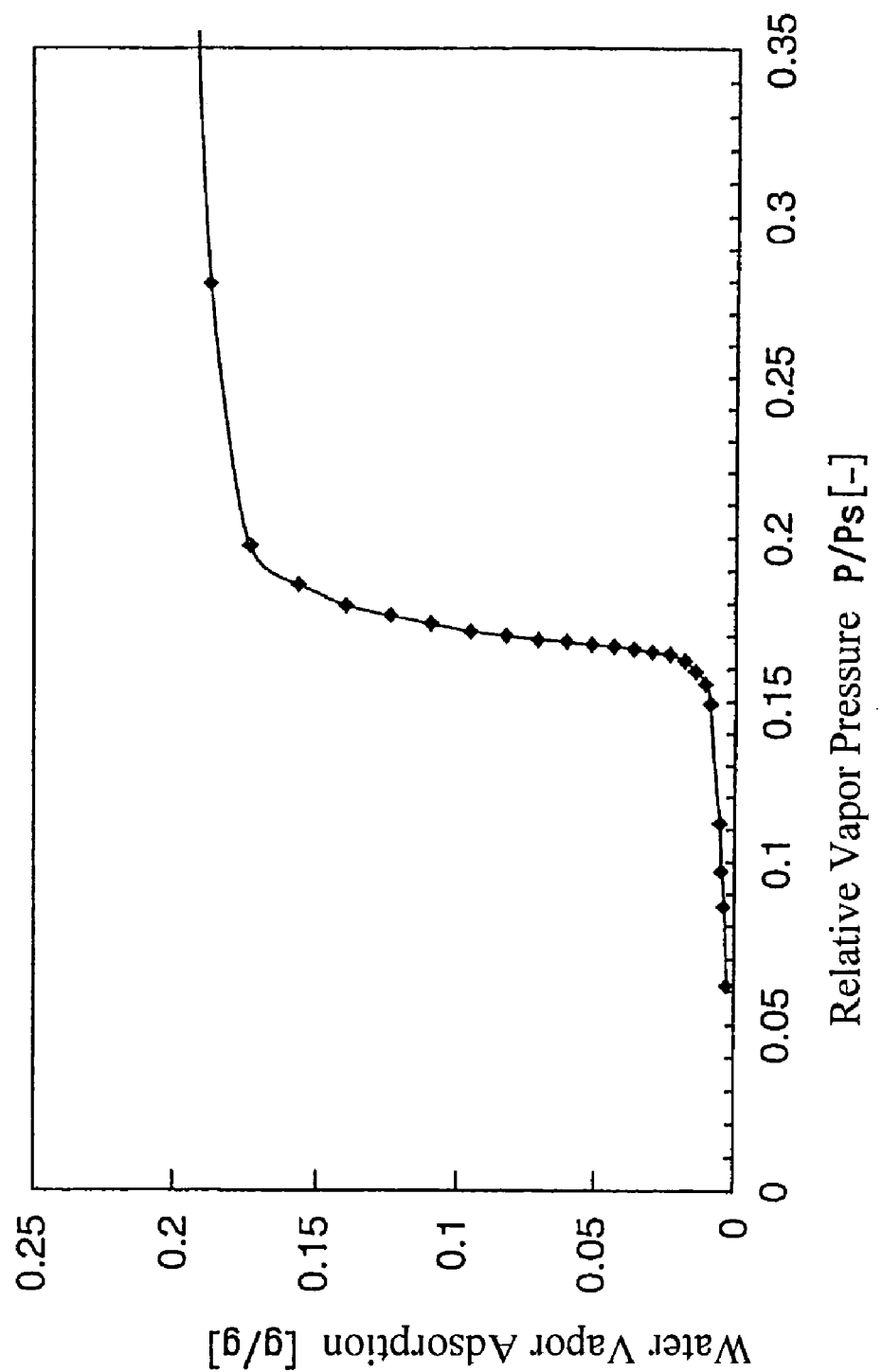
FIG. 8 is a graph showing a water vapor adsorption isotherm of the absorbent (FAPO-5) used in Example 1.

FIG. 8 shows a water vapor adsorption isotherm of the above zeolite as measured at a temperature of 25° C. using an adsorption isotherm measuring apparatus "BELLSORB 18" manufactured by Nippon Bell Co., Ltd. Meanwhile, the measurement of the adsorption isotherm was performed at an air high-temperature vessel temperature of 50° C., an adsorption temperature of 25° C., an initial introduction pressure of 3.0 torr, an introduction pressure setting point of 0 and a saturated vapor pressure of 23.76 mmHg for an equilibrium time of 500 sec.

From the results shown in FIG. 8, it was confirmed that the above zeolite abruptly adsorbed water vapor in a relative vapor pressure range of 0.15 to 0.20, the maximum change in amount of water vapor adsorption when changing the relative vapor pressure by 0.1 in a relative vapor pressure range of 0.12 to 0.25 was 0.17 g/g, and the change in amount of water vapor adsorption in a relative vapor pressure range of 0.14 to 0.22 was 0.17 g/g. The FAPO-5 having such properties was one of most preferred adsorbents usable in the present invention.

Meanwhile, when the water vapor adsorption temperature (Ta) was 25 to 45° C., the water vapor desorption temperature (Td) and temperature of cold generated (Tcool) of the zeolite obtained in this Example satisfied the above formulae (I) and (II), and the difference between the amount of water vapor adsorption at the water vapor adsorption temperature (Ta) and the amount of water vapor adsorption at the water vapor desorption temperature (Td) was not less than 0.1 g/g.

Figure 9:
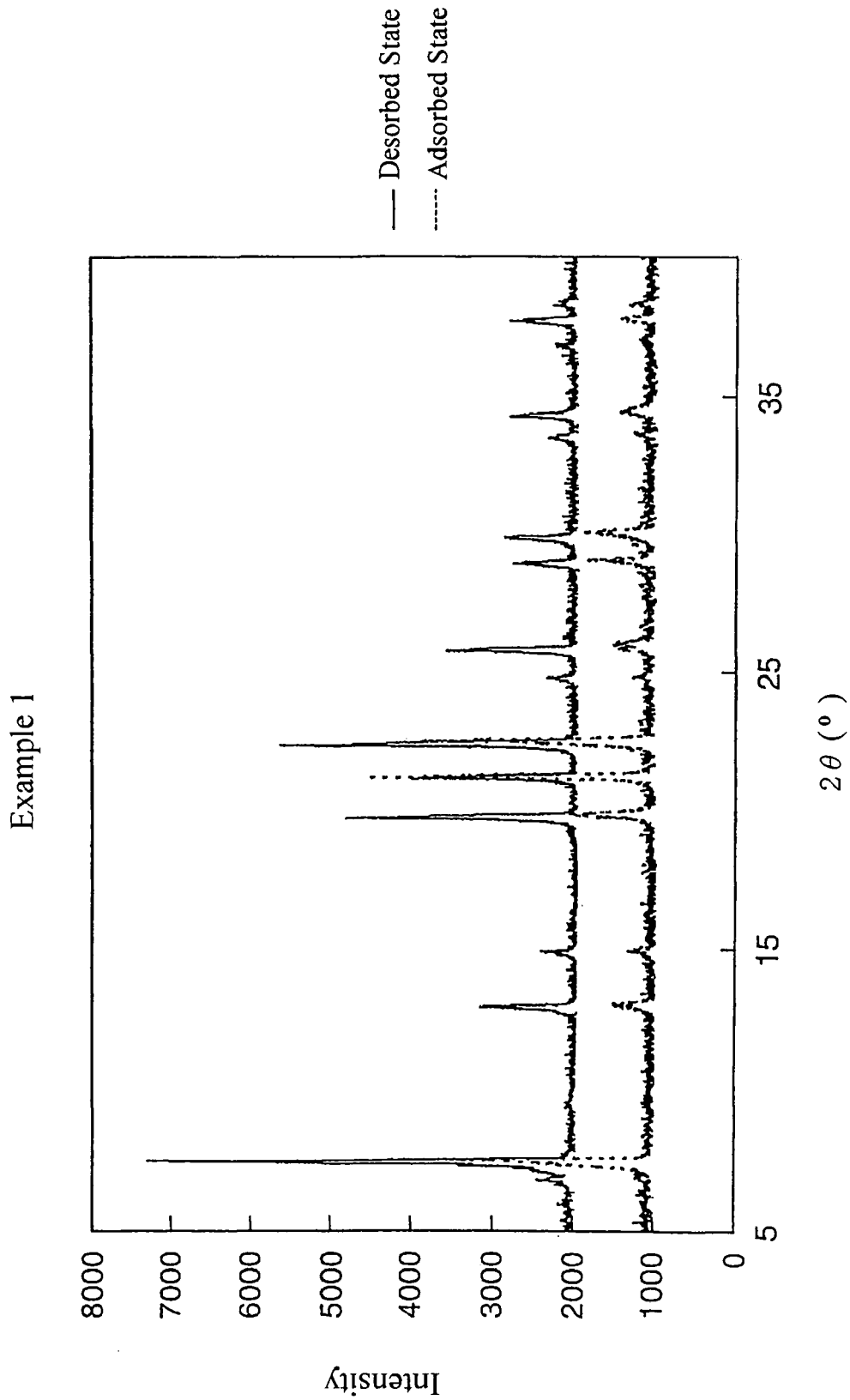
FIG. 9 is a view showing results of XRD analysis of the adsorbent of Example 1 in water vapor-adsorbed and desorbed states.

Next, in order to examine the change in structure of the zeolite upon subjecting the zeolite to the adsorption and desorption of water vapor, the in-situ XRD measurement thereof was conducted using the following apparatus and under the following conditions as described in Table below. Upon the XRD measurement, the zeolite was set within the measuring apparatus, and heated from room temperature (25° C.) to 150° C. at a temperature rise rate of 5° C./min in a nitrogen atmosphere with a humidity of 0%, thereby desorbing water adsorbed in the zeolite. Next, the zeolite was cooled from 150° C. to 45° C. at a temperature drop rate of 5° C./min in a nitrogen atmosphere with a humidity of 0% to measure XRD in the desorbed state at 45° C. Thereafter, nitrogen containing water vapor was introduced into the apparatus to measure XRD in the water vapor-adsorbed state at 45° C. and a relative humidity of 70%. The results of the XRD measurements in the desorbed and adsorbed states are shown in FIG. 9.

XRD measuring apparatus and measuring conditions:

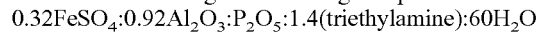

| Measuring apparatus | RINT 2000 Ultima + Series (manufactured by Rigaku Co., Ltd.) |
|---|---|
| Goniometer | Ultima + Horizontal goniometer |
| Attachment | X-ray DSC |
| Monochromater | Fixed monochromater |
| Scanning mode | 2 Theta/Theta |
| Scanning type | Continuous scanning |
| X-ray | 40 kV/50 mA |
| Divergence slit | ½° |
| Divergence vertical limit slit | 10 mm |
| Scattering slit | 1° |
| Light receiving slit | 0.3 mm |
| Monochrome light receiving slit | None |

From the results shown in FIG. 9, it was confirmed that the zeolite was substantially free from change in structure upon subjecting the zeolite to adsorption and desorption of water. In FIG. 9, the position of the maximum peak measured at a diffraction angle 2θ of not more than 15° was changed by 0.06° between the adsorbed and desorbed states.

Also, the zeolite was subjected to durability test. In the durability test, the zeolite was placed in a vacuum container maintained at 90° C., and repeatedly exposed to a saturated water vapor pressure atmosphere at 80° C. and a saturated water vapor pressure atmosphere at 5° C. for 90 sec for each atmosphere. Upon the above repeated procedure, when the zeolite was exposed to the saturated water vapor pressure atmosphere at 80° C., water was adsorbed in the zeolite, whereas when the zeolite was exposed to the saturated water vapor pressure atmosphere at 5° C., most of water adsorbed in the zeolite was desorbed therefrom, and transferred into a reservoir maintained at 5° C. In the durability test, the above adsorption and desorption procedure were repeated 1000 times.

Before and after the durability test, the adsorption isotherm of the zeolite was measured at a temperature of 25° C. under the above-mentioned conditions to examine the change in amount of water adsorption of the zeolite. As a result, it was confirmed that the amount of water adsorption of the zeolite at a relative vapor pressure of 0.25 after the durability test was 95% of that before the durability test, and, therefore, the zeolite was substantially free from change in amount of water adsorption after the durability test.

Example 2

12.6 g of pseudo-boehmite (containing 25% by weight of water: produced by Condea) was added to a mixture of 47 g of water and 23 g of 85% phosphoric acid under stirring. The resultant mixture was stirred for 3 hours, and then mixed with an aqueous solution prepared by dissolving 8 g of gallium nitrate octahydrate in 51 g of water, and further with 14.2 g of triethylamine. The obtained mixture was stirred for 3 hours to obtain a raw reaction mixture. The thus obtained raw reaction mixture was charged into a 200 cc stainless steel autoclave enclosing an inner tube made of Teflon, and allowed to stand at 200° C. for 3 hours for conducting the reaction thereof. After completion of the reaction, the obtained reaction solution was cooled and decanted to remove a supernatant solution therefrom, thereby recovering a precipitate. Then, the thus recovered precipitate was washed with water three times, separated by filtration, and then dried at 120° C. Thereafter, the obtained solid was calcined by the same method as described in Example 1. The thus obtained crystalline gallium aluminophosphate was subjected to XRD measurement. As a result, it was confirmed that the crystalline gallium aluminophosphate was a so-called GAPO-5 having an AFI structure.

In addition, the crystalline gallium aluminophosphate was subjected to elemental analysis by the same method as described in Example 1. As a result, it was confirmed that the molar ratios of the respective components to a sum of aluminum, phosphorus and gallium contained in the skeletal structure thereof were 3.7% for gallium, 45.5% for aluminum and 50.8% for phosphorus.

Figure 10:
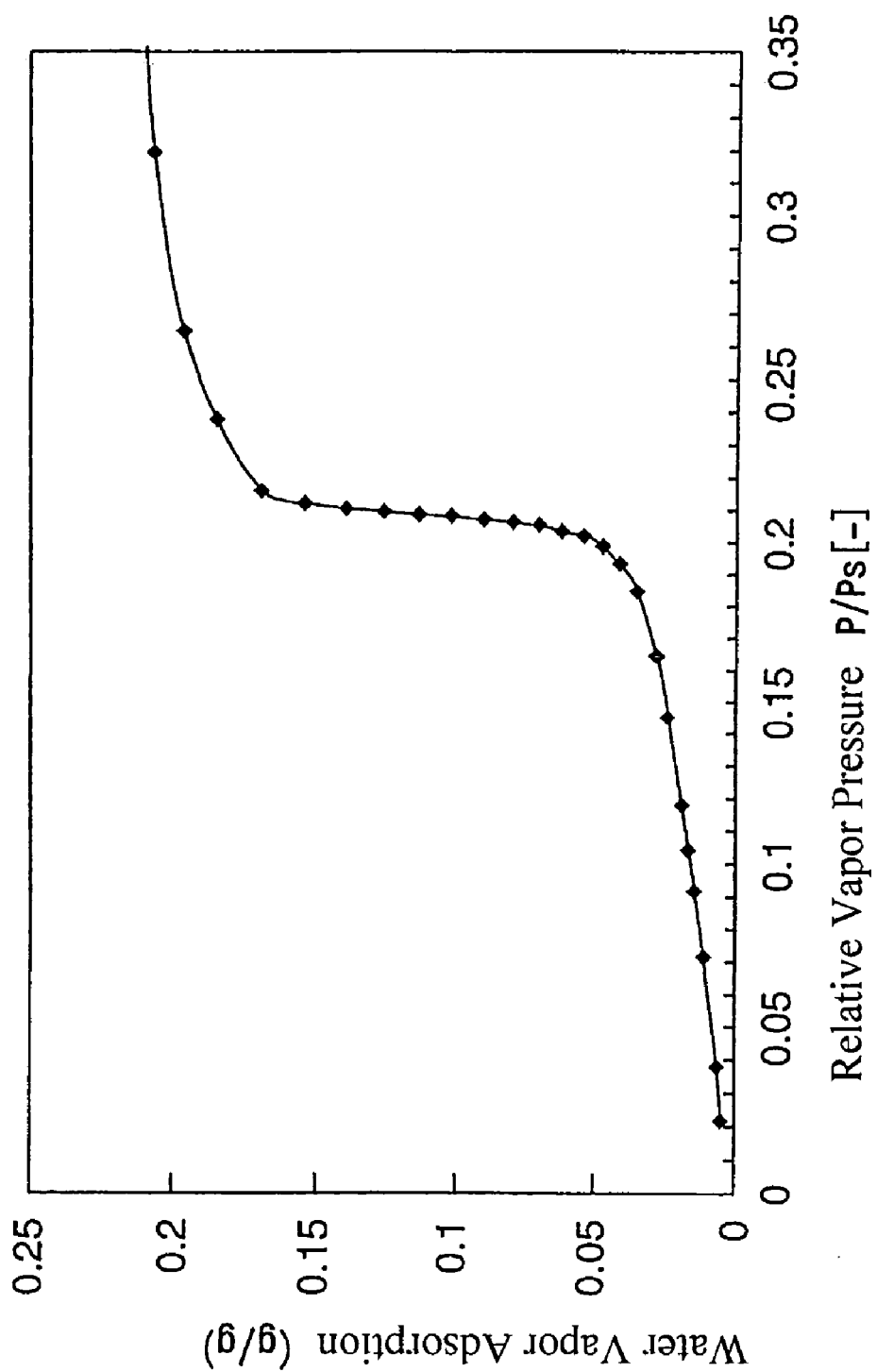
FIG. 10 is a graph showing a water vapor adsorption isotherm of the adsorbent of Example 2.
Figure 11:
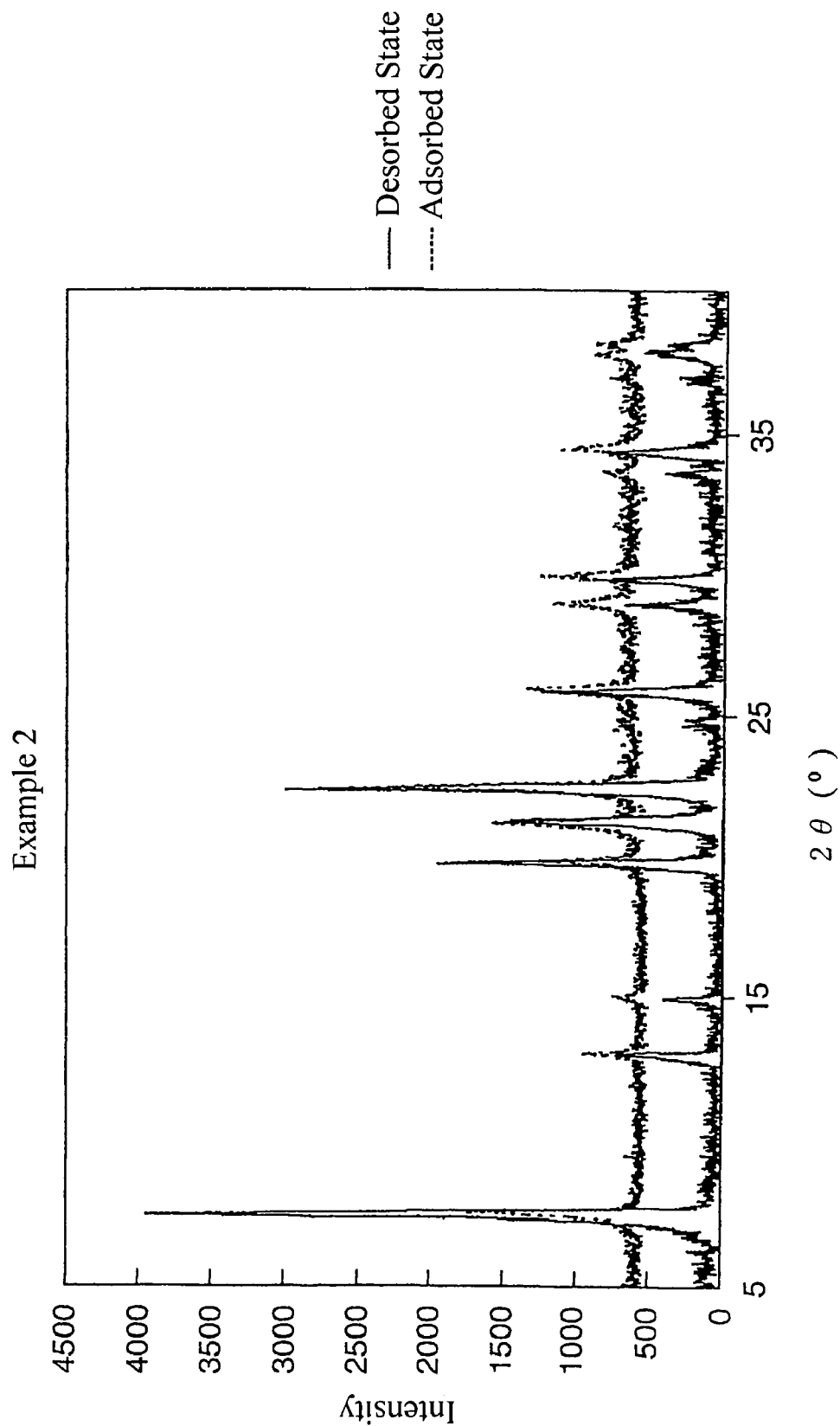
FIG. 11 is a view showing results of XRD analysis of the adsorbent of Example 2 in water vapor-adsorbed and desorbed states.

FIG. 10 shows a water vapor adsorption isotherm of the above zeolite as measured by the same method as described in Example 1. Also, FIG. 11 shows results of XRD in the water vapor-desorbed and adsorbed states of the zeolite as measured by the same method as described in Example 1. From the results shown in FIGS. 10 and 11, it was confirmed that the zeolite was substantially free from change in structure upon subjecting the zeolite to adsorption and desorption of water. As shown in FIG. 11, the position of the maximum peak at a diffraction angle 2θ of not more than 15° was changed by 0.08° between the adsorbed and desorbed states.

Further, the zeolite was subjected to durability test by the same method as described in Example 1. Before and after the durability test, the adsorption isotherm of the zeolite was measured at a temperature of 25° C. under the same conditions as used in Example 1 to examine the change in amount of water adsorption of the zeolite. As a result, it was confirmed that when the relative vapor pressure was 0.25, the amount of water adsorption of the zeolite after the durability test was 75% of that before the durability test, and, therefore, the zeolite underwent only a small change in amount of water adsorption between before and after the durability test.

Comparative Example 1

10.3 g of pseudo-boehmite (containing 25% by weight of water: produced by Condea) was slowly added to a mixture of 38.4 g of water and 17.6 g of 85% phosphoric acid under stirring. The resultant mixture was stirred for 3 hours, and then mixed with 36.6 g of water, and further with 11.6 g of triethylamine. The resultant mixture was stirred for 3 hours, thereby obtaining a raw reaction mixture having the following composition:

$Al_2O_3:P_2O_5:1.5(triethylamine):60H_2O$

The thus obtained raw reaction mixture was charged into a 200 cc stainless steel autoclave enclosing an inner tube made of Teflon, and allowed to stand at 200° C. for 12 hours for conducting the reaction thereof. After completion of the reaction, the reaction solution was cooled and decanted to remove a supernatant solution therefrom, thereby recovering a precipitate. Then, the thus recovered precipitate was washed with water three times, separated by filtration, and then dried at 120° C. Then, 3 g of the thus obtained template-containing material was sampled, placed in a vertical quartz baking tube, heated to 550° C. at a temperature rise rate of 1° C./min under an air flow of 200 mL/min, and then continuously calcined at 550° C. for 6 hours under the same conditions, thereby obtaining a crystalline aluminophosphate. The thus obtained crystalline aluminophosphate was subjected to XRD measurement. As a result, it was confirmed that the crystalline aluminophosphate was a so-called AlPO-5 of an AFI type (containing Al and P in a skeletal structure thereof).

Figure 12:
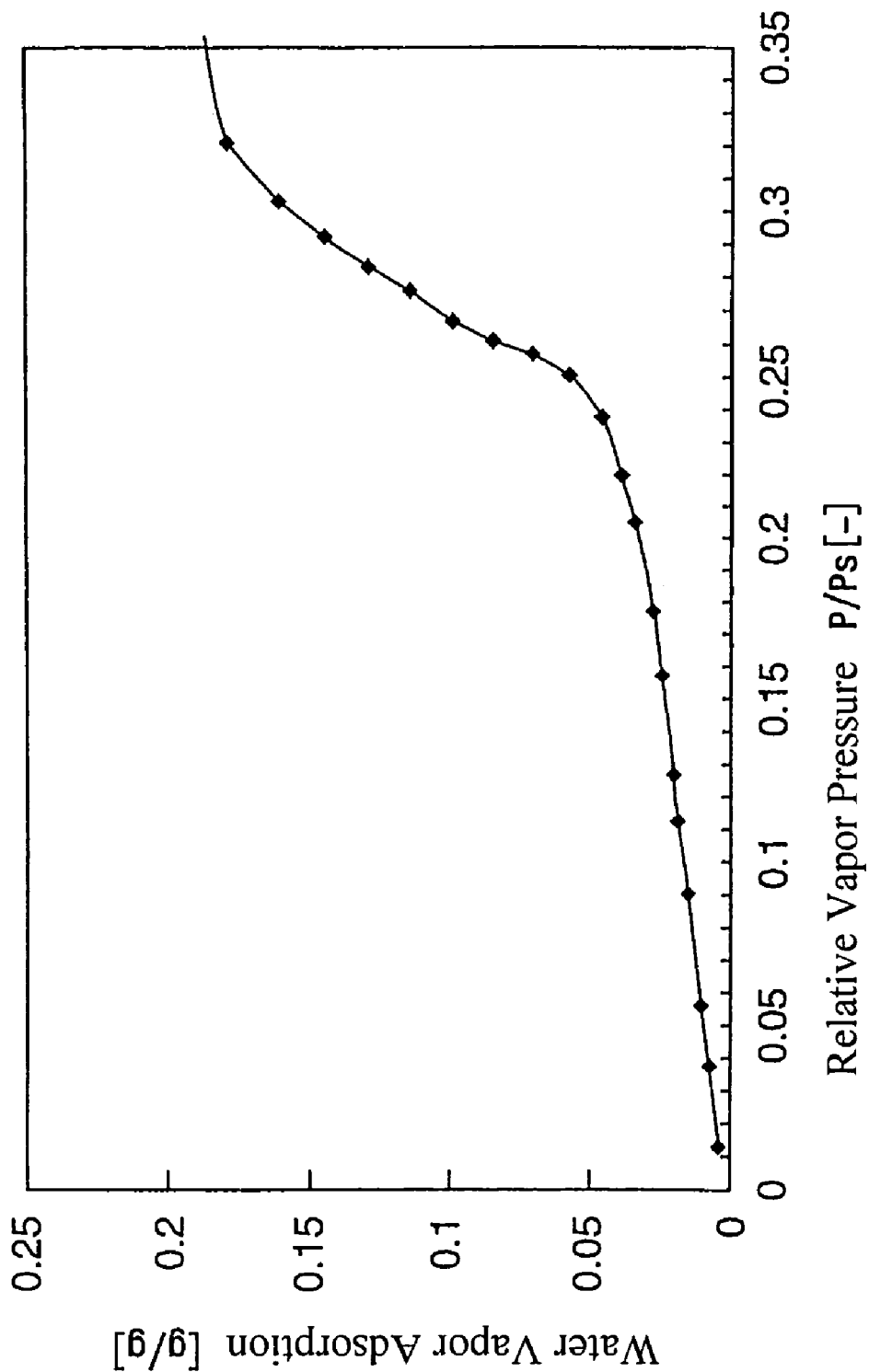
FIG. 12 is a graph showing a water vapor adsorption isotherm of the adsorbent (AlPO-5) of Comparative Example 1.

FIG. 12 shows a water vapor adsorption isotherm of the above zeolite as measured at a temperature of 25° C. using an adsorption isotherm measuring apparatus "BELLSORB 18" manufactured by Nippon Bell Co., Ltd. Meanwhile, the measurement of the adsorption isotherm was performed at an air high-temperature vessel temperature of 50° C., an adsorption temperature of 25° C., an initial introduction pressure of 3.0 torr, an introduction pressure setting point of 0 and a saturated vapor pressure of 23.76 mmHg for an equilibrium time of 500 sec.

From the results shown in FIG. 12, it was confirmed that the change in amount of water vapor adsorption in a relative vapor pressure range of 0.12 to 0.25 was as small as only 0.03 g/g. The AlPO-5 having such properties was unsuitable as the adsorbent of the present invention.

As described above, as compared to the conventional silica gel or zeolite, the adsorbent of the present invention exhibited a large change in amount of water adsorption in the same relative vapor pressure range, and, therefore, showed a higher dehumidification effect when used in the substantially same amount.

Comparative Example 2

20 g of water was added to 8.16 g of pseudo-boehmite, and while stirring the resultant mixture, a solution prepared by adding 20 g of water to 13.8 g of 85% phosphoric acid was dropped thereinto. The obtained mixture was continuously stirred for 2 hours. Then, 6.6 g of DPA (dipropylamine) was dropped to the mixture, and stirred for 2 hours. An one-half amount of the thus obtained starting mixture was charged into a 100 mL autoclave (AC) lined with Teflon, and subjected to hydrothermal synthesis at 110° C. for 4 days. The obtained reaction product was separated by filtration, washed with water and then dried. The thus obtained reaction product was subjected to XRD measurement. As a result, it was confirmed that the obtained product had an AlPO—C (APC) structure. Further, the above product was calcined at 260° C. for 6 hours under an air flow. The thus calcined product was further subjected to XRD measurement. As a result, it was confirmed that the product had an AlPO-D (APD) structure.

Figure 13:
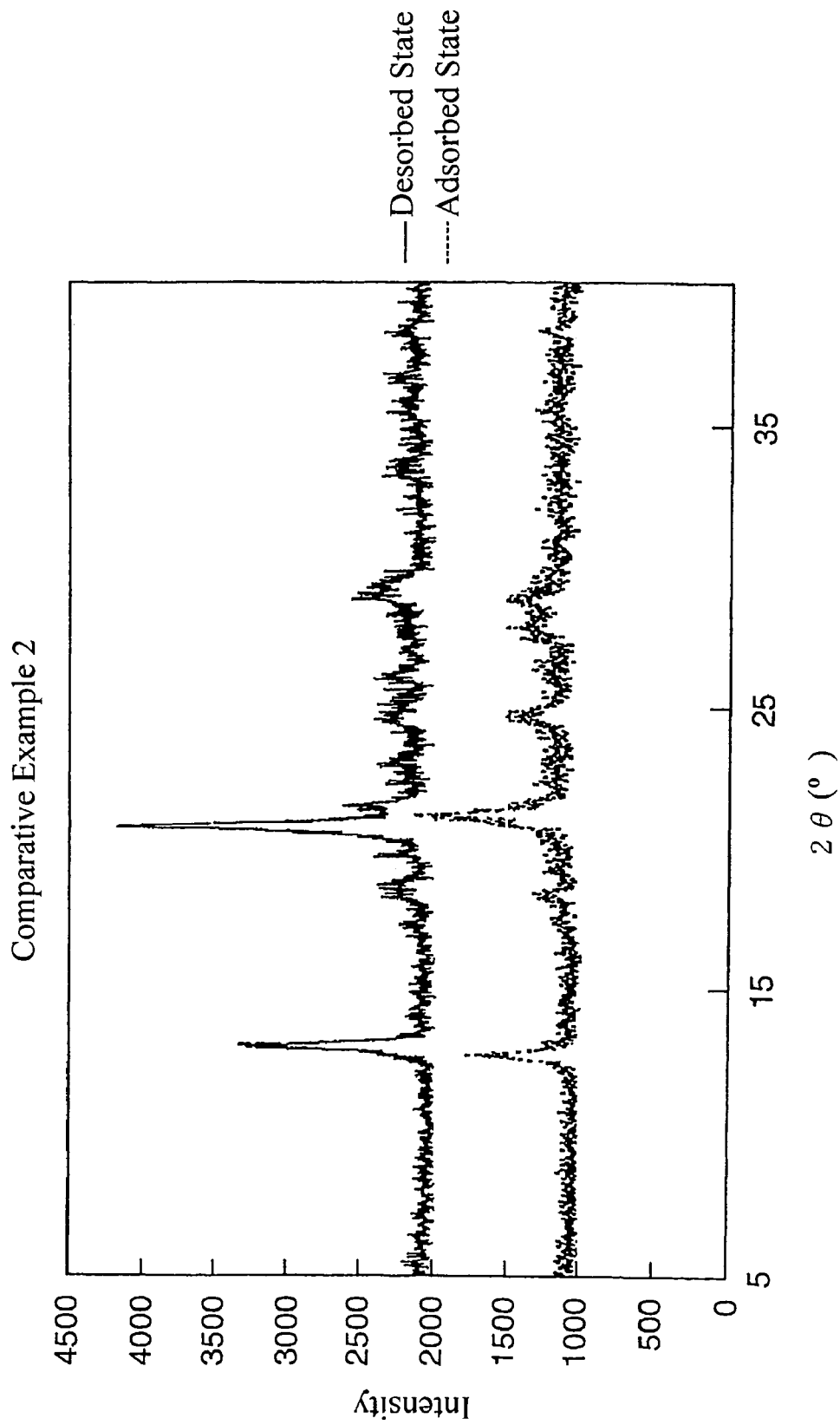
FIG. 13 is a view showing results of XRD analysis of the adsorbent of Comparative Example 2 in water vapor-adsorbed and desorbed states.
Figure 14:
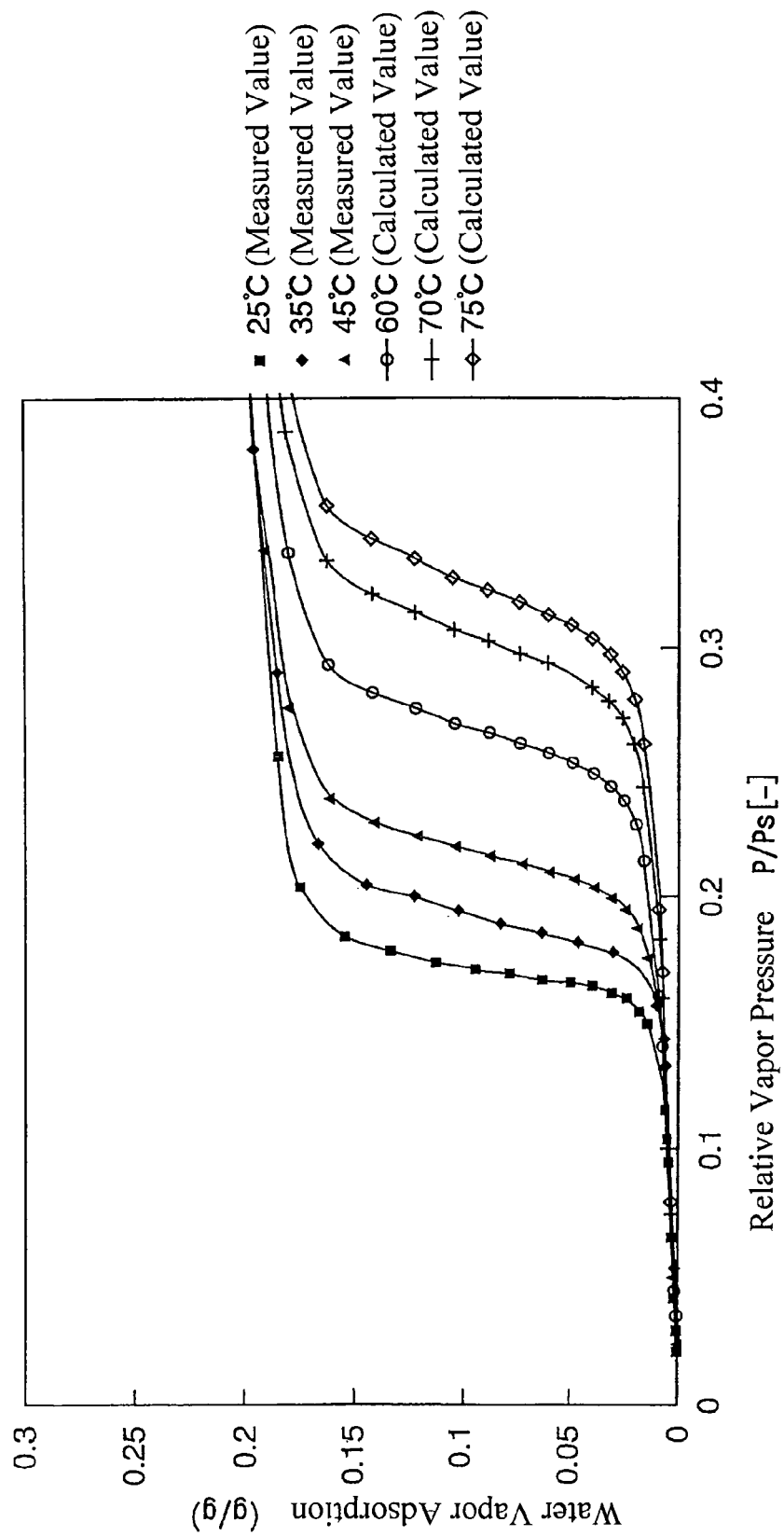
FIG. 14 is a graph showing a water vapor adsorption isotherm of the adsorbent (FAPO-5) of Example 1.

In order to examine the change in structure of the above zeolite upon subjecting the zeolite to adsorption and desorption of water vapor, the XRD measurement was conducted under the same conditions as in Example 1, thereby obtaining the results shown in FIG. 13. From the results shown in FIG. 13, it was confirmed that the position of XRD peak was changed between the adsorbed and desorbed states, i.e., the zeolite in the adsorbed state had an AlPO—H6 structure whereas the zeolite in the desorbed state had an AlPO-D structure, and, therefore, the zeolite suffered from structural change between the adsorbed and desorbed states. As shown in FIG. 13, the position of the maximum peak at a diffraction angle 2θ of not more than 15° was changed by 0.34° between the adsorbed and desorbed states.

Next, the above zeolite was subjected to durability test by the same method as described in Example 1. The amounts of water adsorption of the zeolite at a relative vapor pressure of 0.25 before and after the durability test were compared with each other in the water vapor adsorption isotherm as measured at a temperature of 25° C. similarly to Example 1. As a result, it was confirmed that the amount of water adsorption of the zeolite after the durability test was largely reduced to 28% of that before the durability test, namely, the structure of the zeolite was considerably broken owing to the repeated adsorption and desorption procedure, and, therefore, the zeolite was unstable. Thus, it was recognized that such a zeolite suffering from structural change between the adsorbed and desorbed states exhibited a poor durability and, therefore, unsuitable as the adsorbent of the present invention.

INDUSTRIAL APPLICABILITY

The adsorbent of the present invention exhibits a large difference in amount of water adsorption between the adsorbed and desorbed states, and is capable of being regenerated (desorption) even at a low temperature. Therefore, the adsorbent of the present invention can constitute an adsorption heat pump and a humidity-control air conditioner which are operated by a heat source having a relatively low temperature not more than 80° C. Also, the adsorption heat pump and the humidity-control air conditioner of the present invention can be efficiently operated by a lower-temperature heat source since the adsorbent having the above specific properties is used therein. Furthermore, the operating method of the present invention enables the adsorption heat pump and the humidity-control air conditioner to be efficiently operated using a low-temperature heat, so that exhaust heat discharged from cogeneration systems, etc., can be effectively utilized therein, thereby achieving further saving of energy.

The invention claimed is:

1. An absorbent for adsorption heat pump comprising zeolite containing (I) aluminum, (ii) phosphorus and (iii) iron and/or gallium in a skeletal structure thereof, which is substantially free from change in structure upon subjecting the adsorbent to adsorption and desorption of water vapor, and has an operable relative vapor pressure range in which a change in amount of water adsorption of the adsorbent when changing the relative vapor pressure by 0.1 in a relative vapor pressure range of from 0.1 to 0.25 in a water vapor adsorption isotherm measured at a temperature of 25° C., is not less than 0.12 g/g.

2. An adsorbent for adsorption heat pump according to claim 1, wherein said zeolite has a framework density of from more than 16.0 T/1000 Å$^3$ to 19.0 T/1000 Å$^3$.

3. An adsorbent for adsorption heat pump according to claim 1, wherein said zeolite has abundance ratios of atoms represented by the following formulae (1), (2) and (3):

$$0.001 \leq x \leq 0.3 \quad (1)$$

wherein x is a molar ratio of a sum of iron and gallium to a sum of aluminum, phosphorus, iron and gallium in the skeletal structure;

$$0.3 \leq y \leq 0.6 \quad (2)$$

wherein y is a molar ratio of aluminum to a sum of aluminum, phosphorus, iron and gallium in the skeletal structure; and $$0.3 \leq z \leq 0.6 \quad (3)$$

wherein z is a molar ratio of phosphorus to a sum of aluminum, phosphorus, iron and gallium in the skeletal structure.

4. An adsorbent for adsorption heat pump according to claim 1, wherein an amount of water adsorption of the absorbent at a relative vapor pressure of 0.1 in a water vapor adsorption isotherm measured at a temperature of 25° C. is not more than 0.05 g/g, and an amount of water adsorption of the absorbent at a relative vapor pressure of 0.25 in a water vapor adsorption isotherm measured at a temperature of 25° C. is not less than 0.15 g/g.

5. An adsorbent for adsorption heat pump according to claim 1, wherein said zeolite has an AFI structure as represented by a code of International Zeolite Association (IZA).

6. An adsorbent for adsorption heat pump according to claim 1, wherein said zeolite contains iron in a skeletal structure thereof.

7. An adsorbent for adsorption heat pump according to claim 6, wherein said zeolite satisfies:

(a) a framework density of from more than 16.0 T/1000 Å$^3$ to 19.0 T/1000 Å$^3$;

(b) the following formulae (I) and (II):

$$Ta+28° C. \leq Td \leq 100° C. \quad (I)$$

$$Ta-25° C. \leq Tcool \leq 25° C. \quad (II)$$

wherein Ta is a water vapor adsorption temperature in the range of from 25 to 45° C.; Td is a water vapor desorption temperature; and Tcool is a temperature of cold generated; and (c) a difference between an amount of water vapor adsorption of the adsorbent at the adsorption temperature (Ta) and an amount of water vapor adsorption thereof at the desorption temperature (Td) of not less than 0.1 g/g.

8. An adsorbent for adsorption heat pump according to claim 7, wherein an output density of said adsorbent which is calculated from the difference between an amount of water vapor adsorption thereof at the adsorption temperature (Ta) and an amount of water vapor adsorption thereof at the desorption temperature (Td), and a latent heat of vaporization of water, is not less than 0.5 kW/kg.

9. An absorbent for adsorption heat pump comprising zeolite containing (i) aluminum, (ii) phosphorus and (iii) iron in a skeletal structure thereof, wherein said zeolite satisfies:

(a) a framework density of from more than 16.0 T/1000 Å$^3$ to 19.0 T/1000 Å$^3$;

(b) the following formulae (I) and (II):

$$Ta+28° C. \leq Td \leq 100° C. \quad (I)$$

$$Ta-25° C. \leq Tcool \leq 25° C. \quad (II)$$

wherein Ta is a water vapor adsorption temperature in the range of from 25 to 45° C.; Td is a water vapor desorption temperature; and Tcool is a temperature of cold generated; and (c) a difference between an amount of water vapor adsorption of the adsorbent at the adsorption temperature (Ta) and an amount of water vapor adsorption thereof at the desorption temperature (Td) of not less than 0.1 g/g.

10. An adsorbent for adsorption heat pump according to claim 9, wherein an output density of said adsorbent which is calculated from the difference between an amount of water vapor adsorption thereof at the adsorption temperature (Ta) and an amount of water vapor adsorption thereof at the desorption temperature (Td), and a latent heat of vaporization of water, is not less than 0.5 kW/kg.

11. A heat pump using the adsorbent as defined in claim 1, comprising:
an adsorber which repeatedly conducts an operation of adsorbing an adsorbate therein while releasing heat of adsorption generated, and an operation of desorbing the adsorbate therefrom by external warm heat;
an evaporator which extracts cold heat obtained by vaporization of the adsorbate outside, and recovers a vapor of the adsorbate generated, into the adsorber; and
a condenser which condenses a vapor of the adsorbate desorbed from the absorbent of the adsorber by external cold heat, and supplies the condensed adsorbate to the evaporator.

12. A heat pump according to claim 11, wherein any one of exhaust heat generated from solid polymer-type fuel cells, exhaust heat generated from solar energy-assisted hot water suppliers and exhaust heat generated from internal combustion engine-assisted cogeneration systems, is used as the external warm heat.

13. A method of operating the adsorption heat pump as defined in claim 12, wherein any one of exhaust heat generated from solid polymer-type fuel cells, exhaust heat generated from solar energy-assisted hot water suppliers, and exhaust heat generated from internal combustion engine-assisted cogeneration systems, is used as the external warm heat for desorbing the adsorbate from the absorbent.

14. A heat pump according to claim 11, wherein the adsorber is capable of supplying heat of adsorption discharged during the adsorption operation to an equipment using warm heat.

15. An absorbent for humidity-control air conditioner, comprising zeolite containing (i) aluminum, (ii) phosphorus and (iii) iron and/or gallium in a skeletal structure thereof, which is substantially free from change in structure upon subjecting the adsorbent to adsorption and desorption of water vapor, and has an operable relative vapor pressure range in which a change in amount of water desorption of the absorbent when changing the relative vapor pressure by 0.1 in a relative vapor pressure range of from 0.1 to 0.25 in a water vapor absorption isotherm measured at a temperature of 25° C., is not less than 0.12 g/g.

16. An adsorbent for humidity-control air conditioner according to claim 15, wherein said zeolite has a framework density of from more than $16.0\,T/1000\,\text{Å}^3$ to $19.0\,T/1000\,\text{Å}^3$.

17. An adsorbent for humidity-control air conditioner according to claim 15, wherein said zeolite has abundance ratios of atoms represented by the following formulae (1), (2) and (3):

$$0.001 \leq x \leq 0.3 \tag{1}$$

wherein x is a molar ratio of a sum of iron and gallium to a sum of aluminum, phosphorus, iron and gallium in the skeletal structure;

$$0.3 \leq y \leq 0.6 \tag{2}$$

wherein y is a molar ratio of aluminum to a sum of aluminum phosphorus, iron and gallium in the skeletal structure; and $$0.3 \leq z \leq 0.6 \tag{3}$$

wherein z is a molar ratio of phosphorus to a sum of aluminum, phosphorus, iron and gallium in the skeletal structure.

18. An adsorbent for humidity-control air conditioner according to claim 15, wherein said zeolite contains iron in a skeletal structure thereof.

19. An adsorbent for humidity-control air conditioner according to claim 15, wherein an amount of water adsorption of the absorbent at a relative vapor pressure of 0.1 in a water vapor adsorption isotherm measured at a temperature of 25° C. is not more than 0.05 g/g, and an amount of water adsorption of the absorbent at a relative vapor pressure of 0.25 in a water vapor adsorption isotherm measured at a temperature of 25° C. is not less than 0.15 g/g.

20. An adsorbent for humidity-control air conditioner according to claim 18, wherein said zeolite has an AFI structure as represented by a code of International Zeolite Association (IZA).

21. A humidity-control air conditioner comprising an adsorption and desorption portion including an adsorbent, and a heat supply mechanism for feeding heat to the adsorption and desorption portion, wherein said adsorbent is the absorbent as defined in claim 15.

22. A humidity-control air conditioner according to claim 21, wherein said heat supply mechanism is an external heat source and is any one of exhaust heat generated from solid polymer-type fuel cells, exhaust heat generated from solar energy-assisted hot water suppliers and exhaust heat generated from internal combustion engine-assisted cogeneration systems is used as an external warm heat.

23. A method of operating the humidity-control air conditioner as defined in claim 22, wherein any one of exhaust heat generated from solid polymer-type fuel cells, exhaust heat generated from solar energy-assisted hot water suppliers, and exhaust heat generated from internal combustion engine-assisted cogeneration systems is used as an external warm heat for desorbing an adsorbate from the absorbent.

* * * * *